United States Patent
Lipson et al.

(10) Patent No.: US 10,295,739 B2
(45) Date of Patent: May 21, 2019

(54) ATHERMAL OPTICAL DEVICES BASED ON COMPOSITE STRUCTURES

(71) Applicant: Cornell University, Ithaca, NY (US)

(72) Inventors: Michal Lipson, Ithaca, NY (US); Biswajeet Guha, Ithaca, NY (US)

(73) Assignee: Cornell University, Ithaca, NY (US)

( * ) Notice: Subject to any disclaimer, the term of this patent is extended or adjusted under 35 U.S.C. 154(b) by 77 days.

(21) Appl. No.: 14/786,333

(22) PCT Filed: Apr. 22, 2014

(86) PCT No.: PCT/US2014/035031
§ 371 (c)(1),
(2) Date: Oct. 22, 2015

(87) PCT Pub. No.: WO2014/176277
PCT Pub. Date: Oct. 30, 2014

(65) Prior Publication Data
US 2016/0070062 A1    Mar. 10, 2016

Related U.S. Application Data

(60) Provisional application No. 61/814,778, filed on Apr. 22, 2013.

(51) Int. Cl.
G02B 6/12        (2006.01)
G02B 6/122       (2006.01)
(Continued)

(52) U.S. Cl.
CPC ........... *G02B 6/122* (2013.01); *G02B 6/2934* (2013.01); *G02B 27/0012* (2013.01); *G02B 6/13* (2013.01);
(Continued)

(58) Field of Classification Search
None
See application file for complete search history.

(56) References Cited

U.S. PATENT DOCUMENTS 6,987,895 B2 *  1/2006  Johannessen ...... G02B 6/12007
                                                385/129
9,081,135 B1 *  7/2015  Jones ..................... G02F 1/025
(Continued)

FOREIGN PATENT DOCUMENTS

WO        2002082140 A1    10/2002

OTHER PUBLICATIONS

Guha, B et al., "Athermal silicon microring resonators with titanium oxide cladding," Optics Express, 21 (22):26557-26563, 2013.
(Continued)

*Primary Examiner* — Chris H Chu
(74) *Attorney, Agent, or Firm* — Perkins Coie LLP

(57) ABSTRACT

Methods, systems, and devices are disclosed for implementing athermal optical devices based on composite structures having different components with different thermal properties such as a composite structure having materials of positive and negative thermo-optic effects or a composite structure having materials exhibiting different thermal expansion coefficients. In one aspect, a method for providing thermally stabilized optical device structure against temperature fluctuations includes forming an optical device structure to include a first optical material and a second optical material different from the first optical material, in which one of the first and second optical material exhibits a positive thermal-optic effect and the other one exhibits a negative thermal-optic effect, and structuring the first and second optical materials in the optical device structure to reduce a change in an effective refractive index of the optical
(Continued)

device structure collectively produced by the first and second optical materials in response to a temperature variation.

13 Claims, 15 Drawing Sheets

(51) Int. Cl.
*G02B 6/293* (2006.01)
*G02B 27/00* (2006.01)
*G02B 6/13* (2006.01)

(52) U.S. Cl.
CPC .............. *G02B 2006/12061* (2013.01); *G02B 2006/12078* (2013.01); *G02B 2006/12135* (2013.01)

(56) References Cited

U.S. PATENT DOCUMENTS

| 9,239,431 | B1* | 1/2016 | Rakich | G02B 6/12007 |
| 2006/0067651 | A1* | 3/2006 | Chui | G02B 26/001 385/147 |
| 2009/0220184 | A1* | 9/2009 | Goldring | B82Y 20/00 385/2 |
| 2009/0238515 | A1* | 9/2009 | Fattal | G02B 6/12007 385/30 |
| 2011/0002578 | A1* | 1/2011 | Nakada | G02B 6/12007 385/9 |
| 2012/0243828 | A1* | 9/2012 | Suzuki | G02B 6/12007 385/32 |
| 2014/0002894 | A1* | 1/2014 | Stoeferle | G02B 6/12007 359/351 |

OTHER PUBLICATIONS

Qiu, F. et al. Complementary metal-oxide-semiconductor compatible athermal silicon nitride/titanium dioxide hybrid micro-ring resonators, Applied Physics Letters 102, 051106-1-051106-3 (2013).
Alipour, P. et al., "Temperature-Insensitive Silicon Microdisk Resonators Using Polymeric Cladding Layers," in Conference on Lasers and Electro-Optics, CMAA4, 2009, 2 pages.
Amatya, R. et al., "Low Power Thermal Tuning of Second-Order Microring Resonators," in Conference on Lasers and Electro-Optics/ Quantum Electronics and Laser Science Conference and Photonic Applications Systems Technologies, CFQ5, 2007, 2 pages.
Guha, B. et al., "Athermal silicon microring electro-optic modulator", Opt. Lett. 37(12), 2012, pp. 2253-2255.
Guha, B. et al., "CMOS-compatible athermal silicon microring resonators", Optics Express 18(4), 2010, pp. 3487-3493.
Guha, B. et al., "Athermal Silicon Ring Resonator with Bi-material Cantilever for Passive Thermal Feedback", Optical Society of America, 2013, 2 pages.
Manipatruni, S. et al., "Wide temperature range operation of micrometer-scale silicon electro-optic modulators," Opt. Lett. 33(19), 2008, pp. 2185-2187.
Qiu, C. et al., "Wavelength tracking with thermally controlled silicon resonators", Opt. Express 19 (6), 2011, pp. 5143-5148.
Teng, J., et al., "Athermal Silicon-on-insulator ring resonators by overlaying a polymer cladding on narrowed waveguides," Opt. Express 17(17), 2009, pp. 14627-14633.
Trepakov, V. et al., "A 'soft electronic band' and the negative thermooptic effect in strontium titanate", New Journal of Physics 11, 2009, 9 pages.
Watts, M.R. et al., "Adiabatic Resonant Microrings (ARMs) with Directly Integrated Thermal Microphotonics," IEEE, 2009, 2 pages.
Thomas, S., Authorized Officer, ISA/US, International Search Report, International Patent Application No. PCT/US14/35031, Aug. 29, 2014, 10 pages.

* cited by examiner

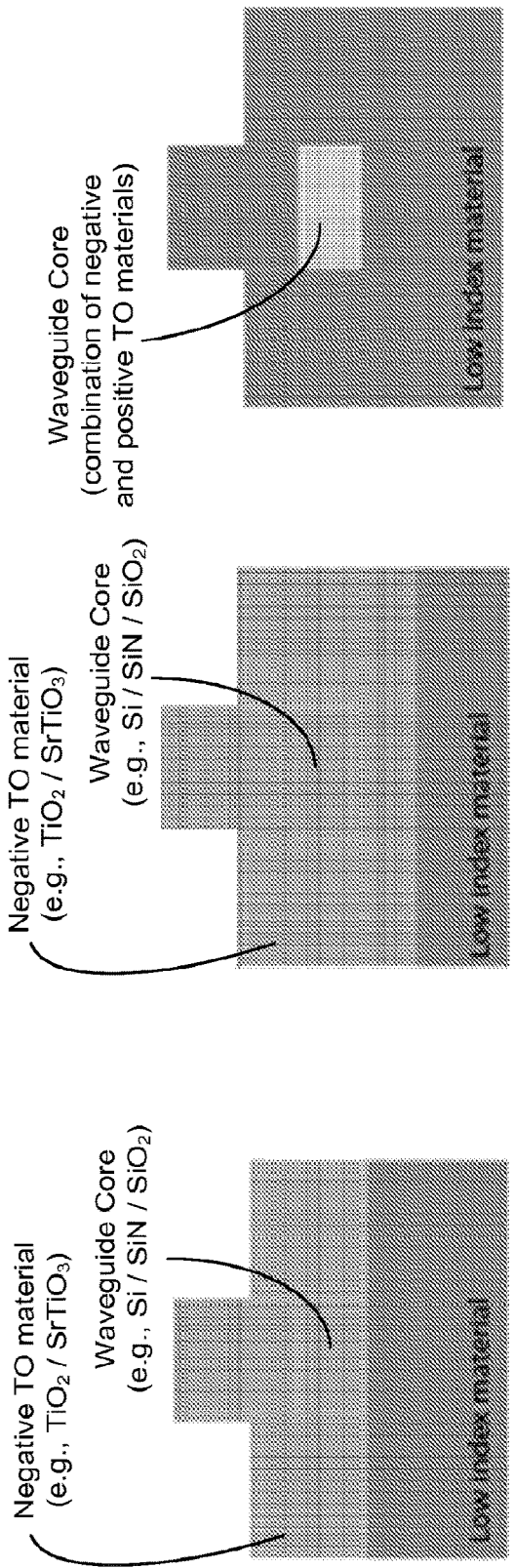

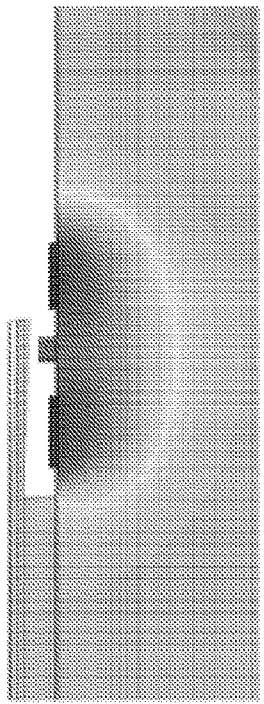
Enhanced Blueshift
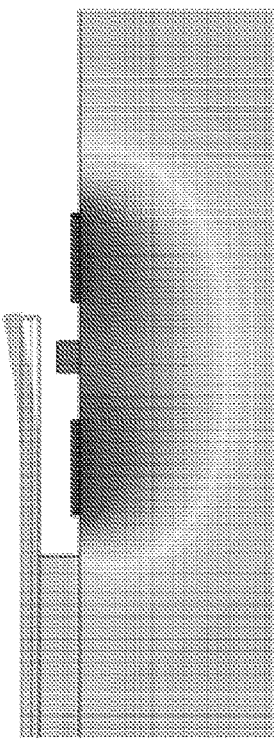
Enhanced Redshift
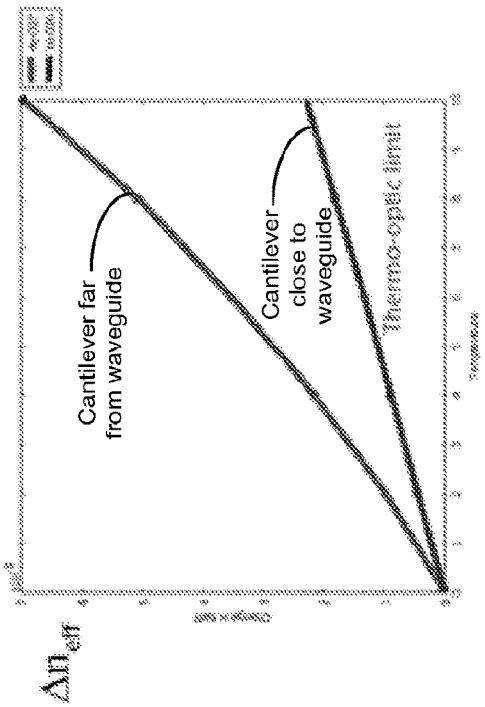
FIG. 15A
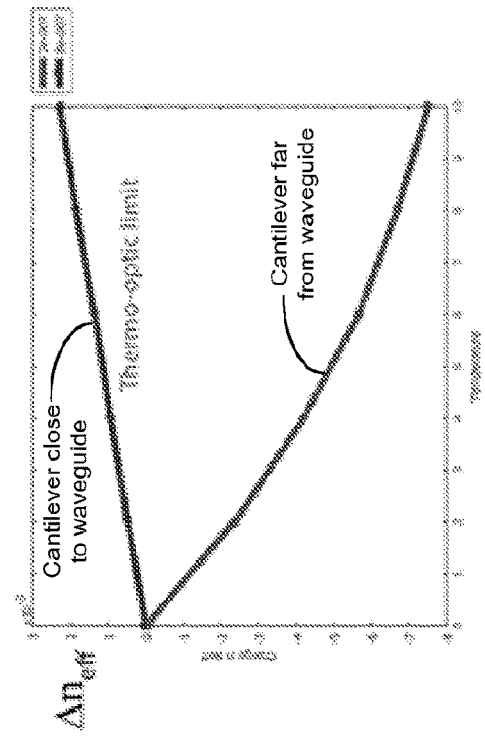
FIG. 15B

ATHERMAL OPTICAL DEVICES BASED ON COMPOSITE STRUCTURES

PRIORITY CLAIM AND RELATED PATENT APPLICATIONS

This patent document is a 35 USC § 371 National Stage application of International Application No. PCT/US2014/035031 filed Apr. 22, 2014, which further claims the benefit of U.S. Provisional Application No. 61/814,778, entitled "ATHERMAL OPTICAL DEVICES BASED ON NEGATIVE THERMO-OPTIC EFFECT" and filed on Apr. 22, 2013. The entire content of the aforementioned patent applications are incorporated by reference as part of the disclosure of this patent document.

TECHNICAL FIELD

This patent document relates to optical devices and photonic devices including integrated photonic devices or circuits formed on substrates.

BACKGROUND

Most materials used in optical devices and photonic devices change certain material properties with temperature, e.g., such as refractive index. Such changes with temperature tend to be undesirable because they can adversely affect the performance of such devices. For example, an optical resonator used in many applications may be intended to work at a specific resonance frequency. A shift in this resonance frequency of the optical resonator due to a temperature change would cause the resonance of the optical resonator to deviate from the specific resonance frequency at a certain temperature. To reduce such undesired thermal functions or dependence, a thermal control mechanism having a cooling element and/or heating element may be implemented in such a device to actively stabilize the performance of the device against temperature fluctuations.

SUMMARY

Techniques, systems, and devices are disclosed for implementing athermal optical devices based on composite structures having different components with different thermal properties such as a composite structure having materials exhibiting both positive and negative thermo-optic effects or a composite structure having materials exhibiting different thermal expansion coefficients.

In one aspect, a method is described for providing thermally stabilized optical device structure against temperature fluctuations. The method includes forming an optical device structure to include a first optical material and a second optical material different from the first optical material, in which one of the first and second optical material exhibits a positive thermal-optic effect and the other one exhibits a negative thermal-optic effect. The method includes structuring the first and second optical materials in the optical device structure to reduce a change in an effective refractive index of the optical device structure collectively produced by the first and second optical materials in response to a temperature variation.

In another aspect, a device for providing thermally stabilized optical property against temperature fluctuations includes a substrate, one or more silicon-based layers exhibiting a positive thermal-optic effect and formed over the substrate, and one or more metal oxide layers exhibiting a negative thermal-optical effect and formed over the substrate, in which the one or more silicon-based layers and the one or more metal oxide layers are configured to form at least one optical device based on a combination of the negative and positive thermal-optic effects to exhibit an optical behavior that remains substantially unchanged with respect to a change in temperature.

In another aspect, a device for providing thermally stabilized optical property against temperature fluctuations includes an optical device structure including a first optical material and a second optical material different from the first optical material, in which one of the first and second optical material exhibits a positive thermal-optic effect and the other one exhibits a negative thermal-optic effect, and in which the first and second optical materials in the optical device structure are configured to collectively reduce a change in optical property of the optical device structure caused by a temperature variation.

In yet another aspect, a device is provided for providing thermally stabilized optical property against temperature fluctuations and includes an optical resonator supporting one or more optical resonator modes; and a composite structure positioned relative to the optical resonator and including a part in a near optical field from the optical resonator to be optically coupled to the optical resonator, the composite structure including materials of different thermal expansion coefficients to shift a position relative to the optical resonator in response to a change in temperature to counter a shift in optical resonance of the optical resonator due to the change in temperature.

Those and other aspects, features and their implementations are described in greater detail in the drawings, the description and the claims.

BRIEF DESCRIPTION OF THE DRAWINGS

FIGS. 1A-1C shows illustrative diagrams of exemplary athermal optical devices of the disclosed technology.

FIGS. 15A and 15B show diagrams and plots depicting an exemplary low power thermal tuning technique.

DETAILED DESCRIPTION

Figure 2A:
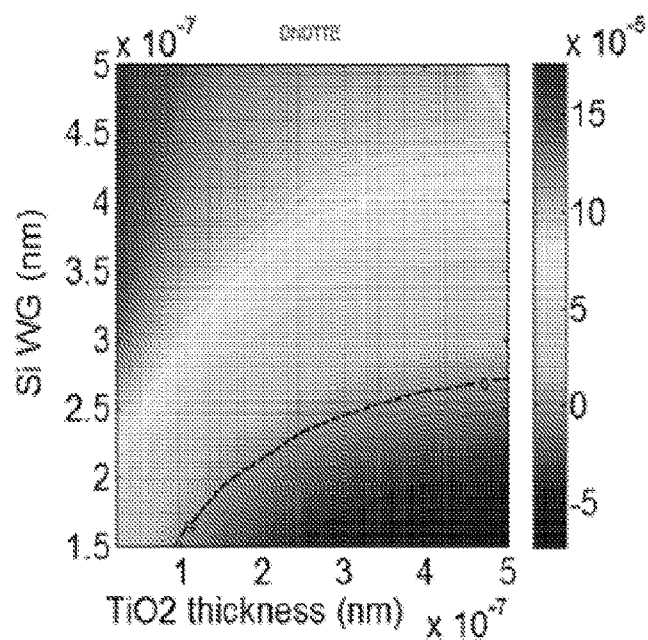
FIGS. 2A and 2B show data plots depicting the thermal sensitivity of the optical mode effective index for TE and TM polarizations, with varying Si waveguide width and $TiO_2$ thickness.

This patent document discloses techniques and device designs that combine one or more materials exhibiting positive thermal-optic effects and one or more materials exhibiting negative thermal-optic effects, or combined different materials of different thermal expansion coefficients to provide built-in athermal device structures that are insensitive to thermal fluctuations. The material compositions, material properties, locations, geometries, dimensions or other properties of such materials can be configured and controlled to allow materials or material components of positive and negative thermal-optic effects or different thermal expansion coefficients to counter a specific change in the overall structure with respect to a change in temperature, thus achieving the desired athermal behavior of a component or a device. The disclosed athermal design can be used in various applications to reduce the impact by device thermal fluctuations. The disclosed athermal design can be used to replace, supplement or complement other thermal stabilization mechanisms such as an active temperature control based on heating/cooling or passive thermal stabilization mechanisms based on using materials of certain thermal expansion properties.

In one example, the disclosed athermal design can be implemented to provide a device for achieving thermally stabilized optical property against temperature fluctuations. This device can include an optical device structure having a first optical material and a second optical material different from the first optical material, where one of the first and second optical material exhibits a positive thermal-optic effect and the other one exhibits a negative thermal-optic effect. The first and second optical materials in the optical device structure are configured to collectively reduce a change in optical property of the optical device structure caused by a temperature variation. In implementations, this optical device structure can be one or more optical or photonic components within a device or system or the device itself.

Examples of the above optical device structure include an optical waveguide, an optical resonator (e.g., an optical Fabry-Perot resonator, a ring resonator, a disk resonator or other micro resonators), an optical interferometer such as an optical Mach-Zehnder interferometer, an optical grating, an optical modulator, an optical filter, a laser cavity or resonator such as a semiconductor diode-laser based laser formed on a substrate, and others.

As an example, consider an optical device in which a positive thermal-optic material and a negative thermal-optic material are both exposed to an optical mode of an optical signal in the optical device. When the temperature of the device changes, the positive thermal-optic material causes a red shift in optical (or resonance) frequency of the device while the negative thermal-optic material causes a blue shift in optical (or resonance) frequency of the device. The combined effect of the positive thermal-optic material and the negative thermal-optic material on the optical mode is a reduced over shift in optical frequency.

The following sections provides specifics examples. These examples cover Si-based materials for CMOS-compatible devices. Various optical or photonic devices based on other semiconductor materials may also be designed to implement the athermal design based on using both positive and negative thermal-optic materials. For example, devices using III-V semiconductor materials such as GaAs-based materials including InGaAs and GaInNAs, GaN, and others can be designed based on the disclosed athermal design.

Sensitivity of any photonic structure to ambient temperature fluctuations stems from the fact that increase in temperature increases the refractive index of all commonly used materials like Si, SiO$_2$, Si$_3$N$_4$ etc. This is called thermo-optic (TO) effect, which is a fundamental material property. This problem manifests in redshift (increase) of cavity wavelength with increase of temperature. This is independent of cavity type like Mach-Zehnder Interferometers (MZI) or resonant systems like ring resonators. Temperature sensitivity is a fundamental problem in integrated optics and major bottleneck in bandwidth scaling of telecommunication systems. To combat this problem, a variety of approaches have been proposed and/or attempted. Some of these conventional approaches are listed in Table 1, below, along with their pros and cons.

TABLE 1

| CONVENTIONAL SCHEMES | PROS | CONS |
| --- | --- | --- |
| Polymer Cladding | Passive | Incompatible with CMOS |
| Heater based feedback | CMOS compatible | Active, power hungry, requires an on-chip heater and temperature sensor |
| Optical power based feedback | No extra on-chip components required | Active, difficult to implement |
| "Smart" MZI based design | Passive, large operating range | Extra footprint required, difficult to implement for small mode volume cavities |

The disclosed techniques include TiO$_2$ or SrTiO$_3$ cladding (with negative thermo-optic effect), which provide a variety of advantages, including, but not limited to, CMOS-compatibility, a very large operating range, deposition techniques, and easy to integrate.

To counteract the redshift of resonance wavelength with increase in temperature, the device needs to be coupled to a mechanism which is capable of blueshifting the resonance wavelength as temperature increases. Most commonly used materials in semiconductor devices have a positive thermo-optic coefficient, e.g., their refractive indices increase with temperature. Examples of such materials include TO$_{Si}$ with an index dependence of the temperature of $1.8 \times 10^{-4}$ K$^{-1}$, TO$_{SiN}$ with an index dependence of the temperature of $2 \times 10^{-5}$ K$^{-1}$, TO$_{SiO2}$ with an index dependence of the temperature of $1 \times 10^{-5}$ K$^{-1}$. Optical devices can be coated with certain polymers having negative thermo-optic effect, but incorporating polymers lead to integration and reliability concerns.

Exemplary implementations were conducted using samples of the disclosed athermal optical structures and devices, and the exemplary results show that certain CMOS-compatible metal oxides, having inherent negative thermo-optic effect, can be deposited on optical devices and the resulting optical properties are robust to any temperature fluctuations without incorporating any extra loss. Titanium dioxide (TiO$_2$) and Strontium titanate (SrTiO$_3$) exhibit negative thermo-optic coefficient due a "soft electronic band". Mode-overlap between Si based materials (Si/SiN/SiO$_2$) and TiO$_2$/SrTiO$_3$ can be engineered by tailoring waveguide geometry and TiO$_2$/SrTiO$_3$ thickness. The sample structures based on the above design exhibited insensitivity of the resultant optical mode to temperature.

FIGS. 1A-1C show illustrative diagrams of exemplary embodiments of the athermal optical devices of the disclosed technology. FIG. 1A shows a diagram illustrating an exemplary athermal optical device structured to include a waveguide core cladded by negative TO material on one side and a low index material substrate on the other side. FIG. 1B shows a diagram illustrating an exemplary athermal optical device structured to include a waveguide core cladded by negative TO material on all sides, in which the negative TO material is formed on a low index material substrate. FIG. 1C shows a diagram illustrating an exemplary athermal optical device structured to include a waveguide core that is made of a stoichiometric mixture of negative and positive TO materials that exhibits insensitivity to a change in temperature and is cladded by a lower index material on all sides.

The guiding layer can either be a waveguide core as used in integrated optics or an optical fiber core. The diagrams of the exemplary athermal optical devices in FIGS. 1A and 1B show that the waveguide core can be cladded either on one side or both the sides with a negative TO material. Part of the optical mode will be delocalized into the cladding layer and this delocalization can be controlled by the waveguide core dimension. So part of the optical mode will experience positive change in index due to waveguide core while part of the mode will experience negative change due to the cladding. If the delocalization is designed properly, then these two effects will cancel each other out. The diagram of the exemplary athermal optical device in FIG. 1C show the waveguide core formed of a specially designed stoichiometric mixture of positive and negative TO materials. For example, this can be achieved by a controlled deposition of TiO$_2$ together with SiN or SiO$_2$.

A thermally insensitive optical mode can be achieved by careful choice of device geometrical parameters. One example is used in the exemplary embodiment shown in FIG. 1A, where the waveguide core is made of Si (n=3.5) cladded by SiO$_2$ (n=1.45) on bottom and TiO$_2$ (n=2.35) on top. Effective index of the optical mode (n$_{eff}$) and temperature sensitivity of the effective index ($\delta n_{eff}/\delta T$) are computed using a Finite Element Mode solver for different geometrical parameters. Reducing the Si waveguide width delocalizes the optical mode into TiO$_2$ cladding so that the optical mode experiences more negative shift with temperature in the cladding region. Table 2 shows the thermo-optic coefficient of exemplary materials.

TABLE 2

| MATERIAL | THERMO-OPTIC COEFFICIENT (K$^{-1}$) |
|---|---|
| Si | $1.8 \times 10^{-4}$ |
| SiO$_2$ | $1 \times 10^{-5}$ |
| Si$_3$N$_4$ | $2 \times 10^{-5}$ |
| TiO$_2$ | $-1 \times 10^{-4}$ |
| SrTiO$_3$ | $-1 \times 10^{-5}$ |

Exemplary Implementations of Exemplary Athermal Optical Devices of the Present Technology Exemplary implementations of the disclosed athermal optical devices were performed. In some implementations described below, an exemplary athermal optical device including a waveguide core cladded by negative TO material on one side and a low index material substrate on the other side was utilized.

Figure 2B:
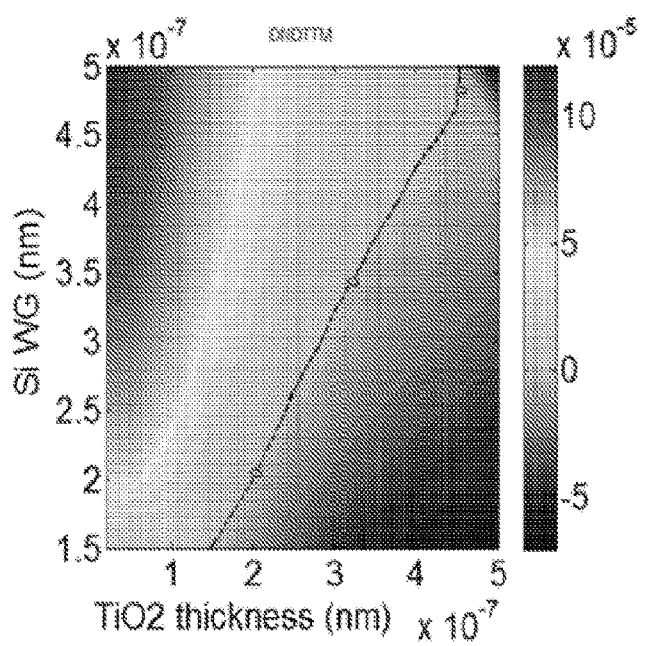

FIGS. 2A and 2B show data plots depicting the thermal sensitivity of the optical mode effective index ($\delta n_{eff}/\delta T$) for TE polarizations (FIG. 2A) and TM polarizations (FIG. 2B), e.g., with varying Si waveguide width and TiO$_2$ thickness. In the exemplary implementations, Si waveguide height was 250 nm. The exemplary black dashed line represents the contour where effective index does not change with temperature. The exemplary device configuration of FIG. 1A was utilized in the exemplary implementations.

The exemplary results in the data plots of FIGS. 2A and 2B show the variation of $\delta n_{eff}/\delta T$ for different Si waveguide widths and TiO$_2$ thickness for the two polarizations. It can be seen that temperature sensitivity of the optical mode can be reduced to zero with the right choice of waveguide width and TiO$_2$ thickness. TM polarization gives a greater freedom in choice of waveguide width due to greater vertical delocalization of the optical mode.

Figure 3:
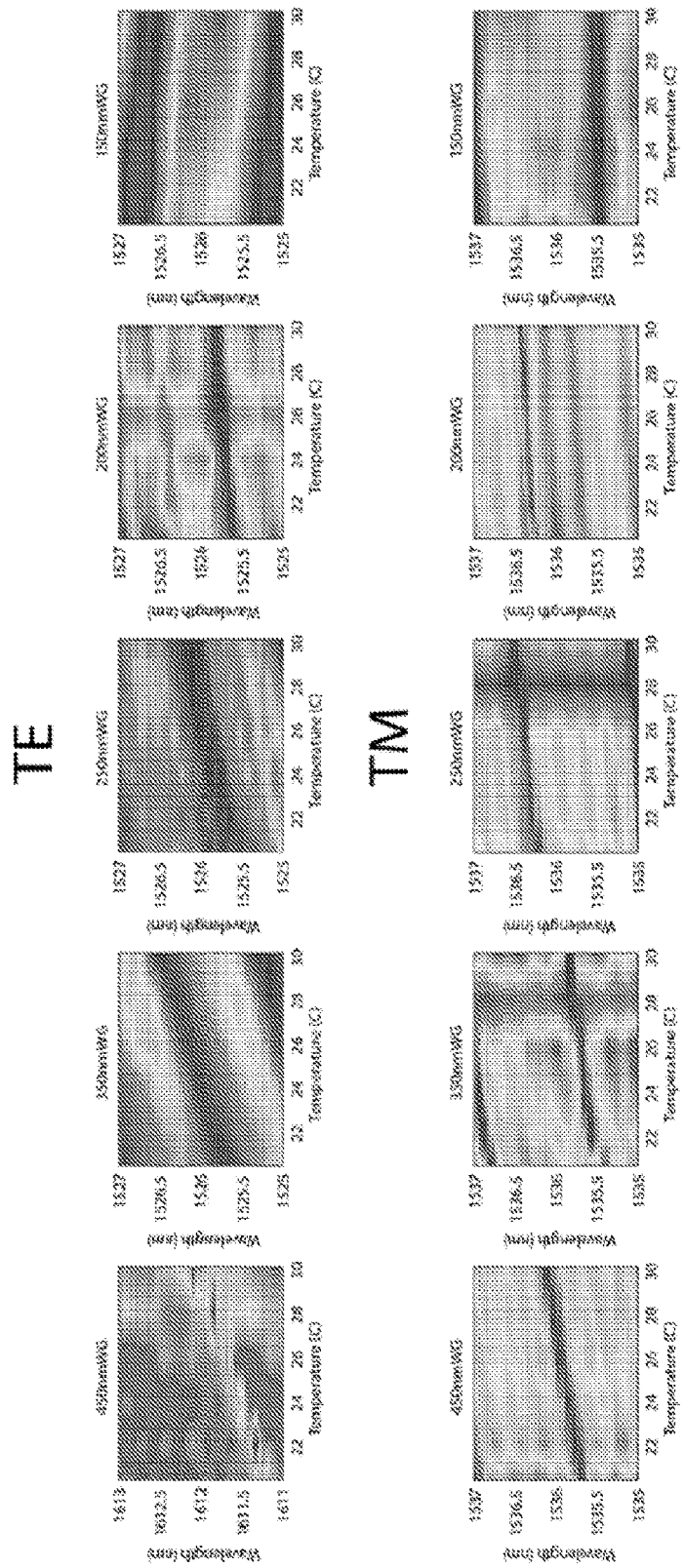
FIG. 3 shows exemplary graphical data plots showing the resonance wavelength behavior with temperature for different waveguide widths.

Measurements were conducted on the transmission spectrum of ring resonators with the Si waveguide width ranging from 100 nm to 450 nm, and TiO$_2$ thickness of 250 nm. TiO$_2$ was deposited on Si waveguides by DC reactive sputtering of Titanium in oxygen atmosphere. FIG. 3 shows the transmission spectra of TE and TM polarizations over a 10 degree temperature range. For TE polarization, the optical resonance exhibited redshifts at a rate of ~0.1 nm/K for the 450 nm wide waveguide. The sensitivity reduces as waveguide width is decreased. For waveguide width of 150 nm, resonance wavelength decreases with the rising temperature (blueshift) in the optical resonance with temperature is clearly visible. For TM polarization, the initial sensitivity is about 0.03 nm/K for 450 nm wide waveguide and it approaches to zero for 150 nm wide waveguide.

FIG. 3 shows exemplary graphical data plots showing the resonance wavelength behavior with temperature for different waveguide widths.

Figure 4:
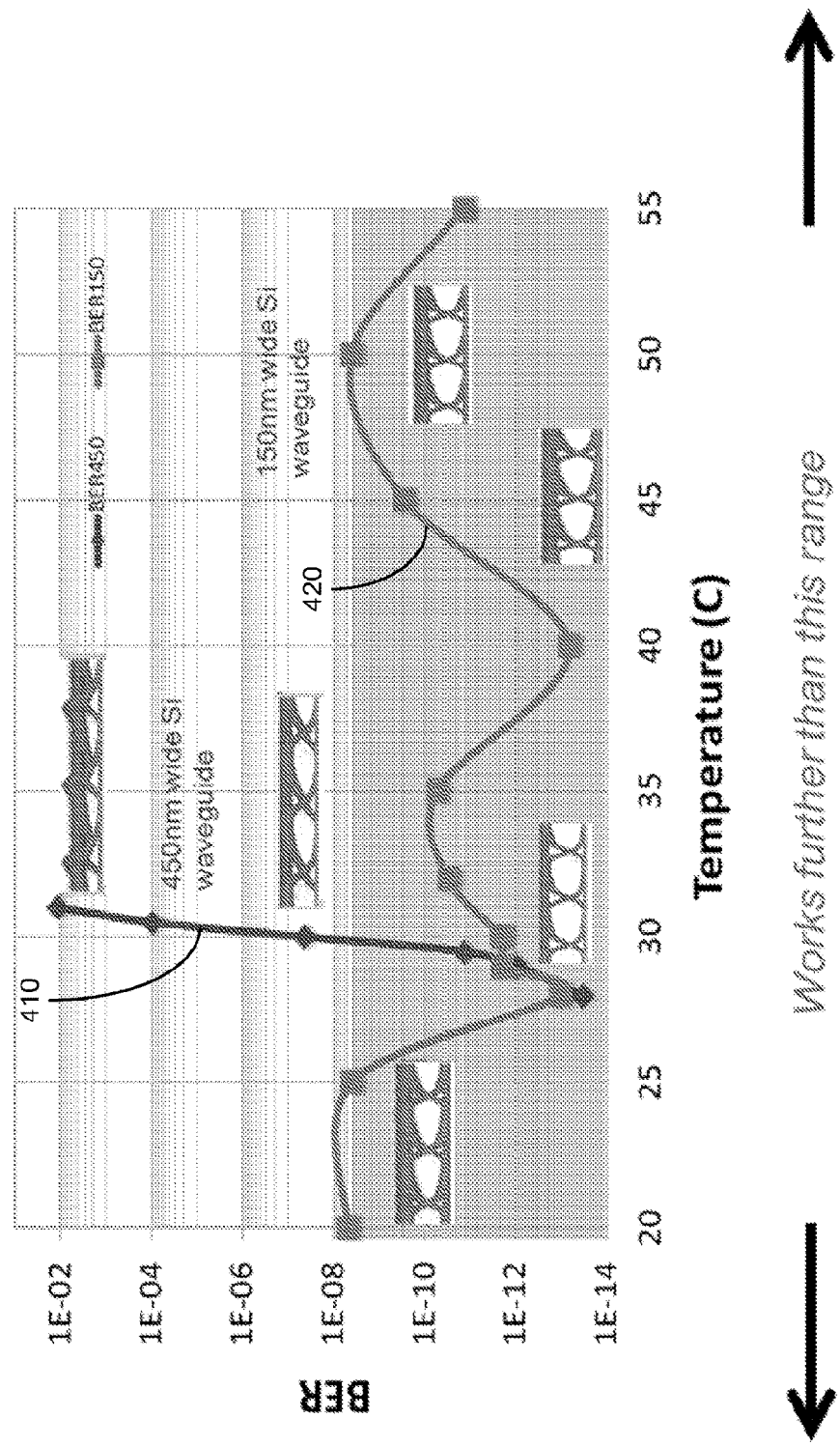
FIG. 4 shows an exemplary plot depicting the resonant data transmission through the exemplary device at 5 Gbps.

For the case of TM polarization in 150 nm wide waveguide, which showed athermal behavior, high speed data (e.g., 5 Gbps, $2^{31}-1$ NRZ PRBS) was transmitted through the device on resonance and recorded the eye diagram and bit error rate (BER) as a function of temperature. FIG. 4 shows the variation in BER over temperature for the athermal device and compares it to the device with 450 nm wide Si waveguide, which had a resonance sensitivity of 0.03 nm/K. It can be seen that while the device with greater thermal sensitivity becomes unusable after only 5 degrees, the exemplary athermal device shows error free performance over 35 degrees, limited only by measurement capabilities. Corresponding eye diagrams are also shown at different temperatures to illustrate this improved performance.

FIG. 4 shows an exemplary plot depicting the resonant data transmission through the exemplary device at a data rate of 5 Gbps. As shown in the data plot of FIG. 4, the blue curve 410 represents an exemplary 450 nm wide Si waveguide, while the red curve 420 represents an exemplary 150 nm wide Si waveguide.

The above examples demonstrate implementations of an exemplary athermal design of the disclosed technology to realize CMOS-compatible athermal optical devices by overlapping the mode with a material having negative thermo-optic coefficient like $TiO_2$. Exemplary implementations were demonstrated for Si based ring resonators, but this method is applicable for any material system. The disclosed thermal management technology described herein will significantly lower the thermal budget of integrated optical systems and make them more viable for commercial integration.

Figure 5A:
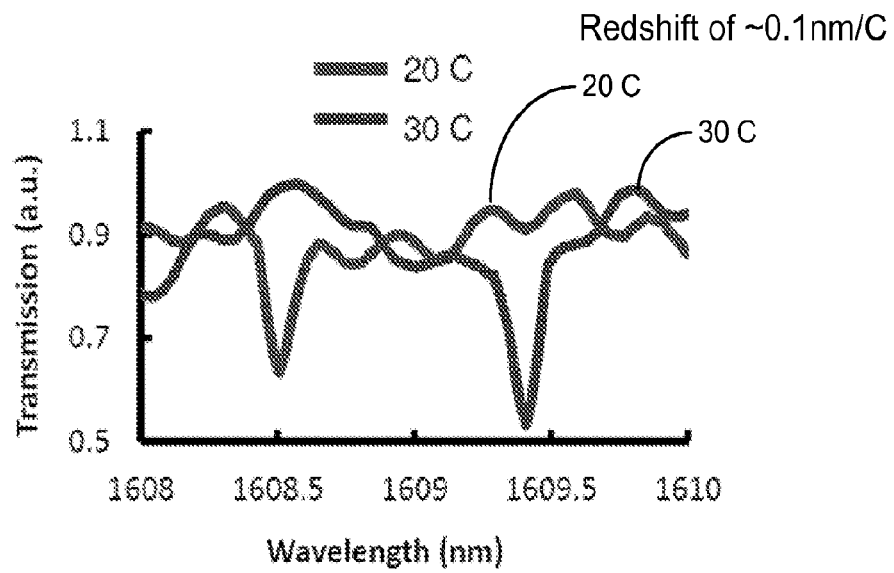
FIGS. 5A and 5B show data plots of exemplary results from implementations of a conventional Si waveguide and an exemplary device including $TiO_2$ cladded Si waveguide.
Figure 5B:
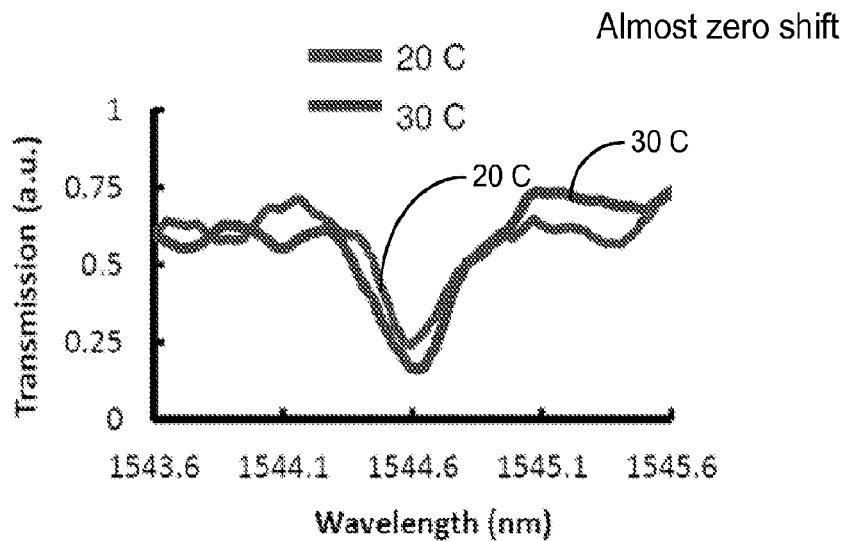

FIGS. 5A and 5B show data plots of exemplary results from implementations of a Si waveguide made of materials with positive TO coefficients (FIG. 5A) and of an exemplary device including $TiO_2$ cladded Si waveguide of an optimum thickness to use the negative TO effect in $TiO_2$ for reducing the temperature dependence (FIG. 5B). As shown in the data plot of FIG. 5A, the exemplary conventional Si waveguide demonstrated a redshift of ~0.1 nm/C. Whereas in the data plot of FIG. 5B, the exemplary device demonstrated almost zero shift.

Exemplary Athermal Silicon Microring Resonators

Further implementations of the exemplary athermal optical device including a waveguide core cladded by negative TO material on one side and a low index material substrate on the other side were performed. In some implementations described below, the exemplary athermal optical device was configured in an athermal silicon microring resonator design.

The disclosed athermal optical device designs can be implemented to produce athermal silicon microring resonators. Described below are techniques for producing and implementing CMOS-compatible passively temperature insensitive silicon-based optical devices using titanium oxide cladding, which has a negative thermo-optic (TO) effect. Techniques to engineer the mode confinement in Si and $TiO_2$ are presented, such that positive TO of Si is exactly cancelled out by negative TO of $TiO_2$. The exemplary implementations demonstrate robust operation of the exemplary devices, e.g. including over 35 degrees.

In practice, integrated photonic devices are extremely sensitive to ambient temperature fluctuations, which limit their integration in wavelength sensitive applications. This problem is especially severe in silicon photonics where high index contrast, large thermo-optic coefficient of Si and high quality factors make the microring resonators extremely susceptible to thermal fluctuations. For example, a Si ring resonator with a quality factor of 10,000 will tune out of resonance with only 1° C. change in temperature.

The present technology provides a novel approach for passive and CMOS-compatible temperature insensitive integrated optical devices using a metal-oxide cladding having negative thermo-optic effect. Metals oxides like $TiO_2$ and $SrTiO_3$ have been investigated in semiconductor industry as a gate dielectric material. These metal oxides also have negative thermo-optic coefficient (TO) due to presence of a soft electronic band (e.g., $TO_{TiO2}$~$1\times10^{-4}K^{-1}$, $TO_{SiO2}$~$1\times10^5K^{-1}$). This is in contrast to commonly available dielectrics and semiconductors which have positive thermo-optic coefficients (e.g., $TO_{Si}$=$1.8\times10^{-4}K^1$, $TO_{SiN}$~$2\times10^5K^1$, $TO_{SiO2}$~$1\times10^5K^1$). There has been some limited effort in reducing temperature sensitivity of optical devices using $TiO_2$ overcladding. The disclosed technology is capable of producing completely athermal optical devices by engineering the mode-overlap between Si based materials (Si/SiN/$SiO_2$) and $TiO_2$. The exemplary techniques of temperature compensation is CMOS-compatible, lossless, does not require any extra footprint, and can lead to very large temperature operating ranges.

An exemplary design for such athermal optical devices is described below. To ensure that the positive TO effect of the Si core is exactly cancelled out by negative TO effect of the cladding, the disclosed techniques include engineering the optical mode confinement in $TiO_2$ cladding layer by tailoring the waveguide dimension and the cladding thickness. In some implementations, for example, both transverse electric (TE) and transverse magnetic (TM) are considered like optical modes in a 220 nm thick Si guiding layer with varying waveguide widths and $TiO_2$ cladding thicknesses.

Figure 6A:
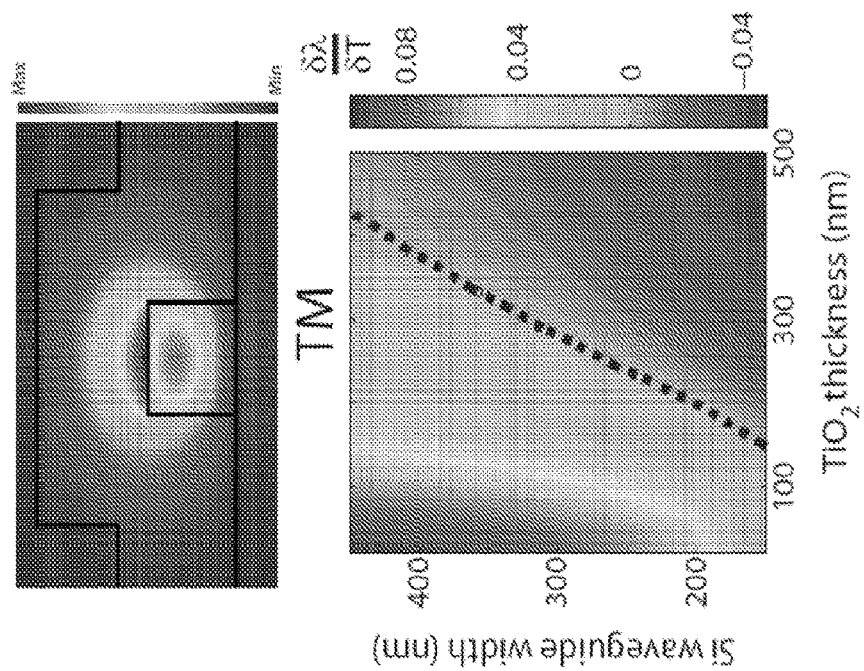
FIGS. 6A and 6B show plots of the resonance wavelength sensitivity to temperature ($\partial \lambda_0/\partial T$ in nm/K) for TE and TM polarizations.
Figure 6B:
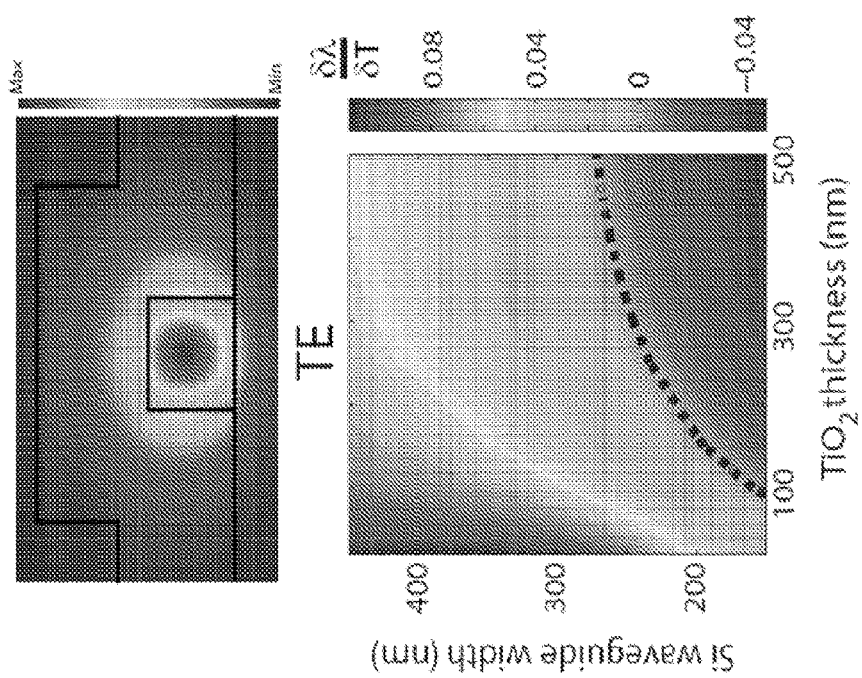

FIGS. 6A and 6B show data plots of the resonance wavelength sensitivity to temperature ($\partial\lambda_0/\partial T$ in nm/K) for TE and TM polarizations. The exemplary data shown in FIGS. 6A and 6B utilized configurations including Si guiding layer of 220 nm thick and $TiO_2$ cladding thickness of 300 nm. The exemplary black dashed line in the plot represents the optimum waveguide width and cladding thickness for athermal operation. Energy flux density of optical modes in a 250 nm wide waveguide is shown at the top of the plots.

FIG. 6A shows the Poynting vector of the TE mode of a 250 nm wide hybrid $TiO_2$—Si waveguide of the disclosed technology and temperature sensitivity of the resonance wavelength, when the TE mode is in resonance. FIG. 6B shows the same for the TM mode. Optical modes are simulated using a Finite Element Method based solver (COMSOL), assuming the thermo-optic coefficients mentioned previously. The refractive indices of $TiO_2$ was assumed to be 2.35 (e.g., measured using ellipsometry). Temperature sensitivity is characterized in terms of resonance wavelength change with temperature $$\left(\frac{\partial\lambda_0}{\partial T} = \frac{\lambda_0}{n_g}\frac{\partial n_{eff}}{\partial T}\right).$$

For example, it is noted that this sensitivity is independent of device structure (e.g., ring resonators or photonic crystal cavitites) and depends only on modal confinement in Si. For both TE and TM polarizations, for example, the resonance wavelength sensitivity is ~0.1 nm/K for modes strongly confined in Si, and without any $TiO_2$ cladding. This sensitivity decreases as the mode is delocalized into the $TiO_2$ cladding and the thickness of the $TiO_2$ cladding is increased.

For example, for achieving true athermal operation, the exact geometry of the Si waveguide and $TiO_2$ cladding thickness needs to be chosen very carefully. For TM mode of a 220 nm thick silicon waveguide, any waveguide width will have a corresponding $TiO_2$ cladding thickness that would allow athermal operation. On the other hand, for the TE mode, if the waveguide is too wide such that the optical mode is strongly confined in Si, athermal operation will not be possible irrespective of $TiO_2$ cladding thickness.

The exemplary athermal ring resonators used in these exemplary implementations were fabricated on a 220 nm thick silicon-on-insulator (SOI) device layer. The waveguides were patterned using electron beam lithography and etched in chlorine chemistry in an inductively coupled reactive ion etcher. Titanium oxide was deposited on top of the waveguides using reactive sputtering of a titanium target in $O_2$. The sputtering was performed at a pressure of $2 \times 10^{-6}$ Torr and 2 kW power.

Figure 7B:
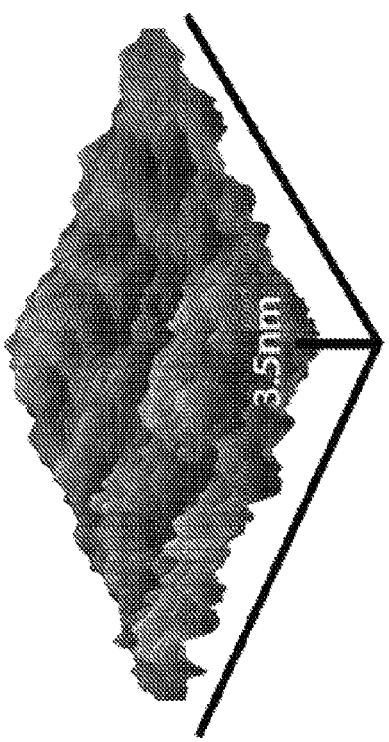
FIG. 7B shows an atomic force microscopy (AFM) image of the $TiO_2$ surface of the exemplary device of FIG. 7A.
Figure 7A:
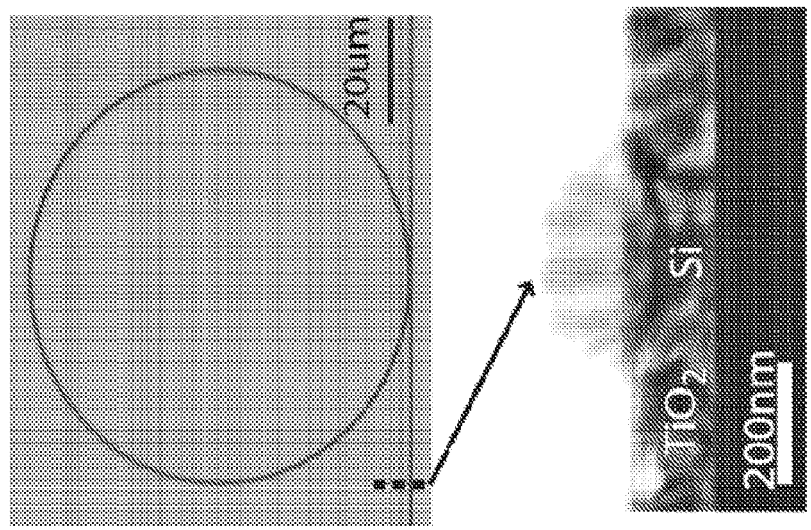
FIG. 7A shows a diagram and scanning electron microscopy (SEM) image of an exemplary $TiO_2$ cladded Si microring resonator athermal optical device.

Sputtered $TiO_2$ films were characterized using a visible-near IR ellipsometer and Raman spectroscopy. Refractive index of ~2.35 was measured at near IR wavelengths. Raman spectrum of the sputtered sample shows no visible peaks, indicating the amorphous nature of the deposited $TiO_2$ film. FIG. 7A shows a diagram and scanning electron microscopy (SEM) image of an exemplary $TiO_2$ cladded Si microring resonator athermal optical device. The exemplary SEM image shows a false-colored cross-section of the exemplary waveguide with 150 nm width and 200 nm thick $TiO_2$ cladding. The Si waveguide width in the fabricated ring resonators was varied from 450 nm to 150 nm to observe the effect of mode delocalization on thermal sensitivity. FIG. 7B shows an atomic force microscopy (AFM) image of the $TiO_2$ surface of the exemplary device of FIG. 7A. The exemplary AFM scan of the surface indicates surfaces roughness below 2 nm RMS.

Figure 8A:
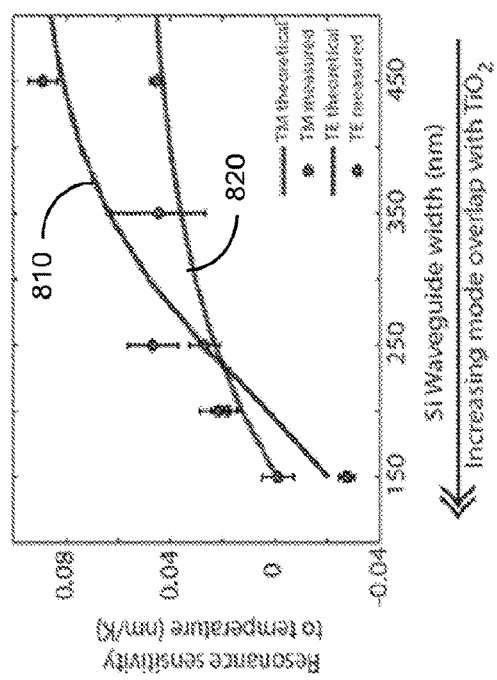
FIG. 8A shows a data plot showing measured resonance sensitivity to temperature as a function of waveguide width for TE and TM modes.

Exemplary implementations of the exemplary athermal Si microring resonator with $TiO_2$ cladding demonstrated temperature insensitive operations of the device. FIG. 8A shows the temperature sensitivity of resonance wavelength of the fabricated microring resonators, for different waveguide widths and polarizations. All of these exemplary resonators were fabricated on the same chip. The temperature sensitivity was measured by collecting spectra over 10 degrees, at intervals of 2 degrees, followed by a linear fit to resonance wavelengths. Error bar in the exemplary data plot of FIG. 8A corresponds to uncertainty in the linear fit. Each waveguide width corresponds to a different confinement in the Si core. The exemplary data was compared against numerically calculated sensitivity assuming $TiO_2$ thickness of 200 nm and $\lambda_0$=1550 nm. For the case of TE polarization (blue line 810), the temperature sensitivity was around 0.09 nm/K when the mode is strongly confined in Si (450 nm wide waveguide). However as the optical mode is delocalized more into $TiO_2$, temperature sensitivity decreases and becomes negative (e.g., ~0.03 nm/K) for 150 nm wide waveguide. For the case of TM polarization (red line 820), the sensitivity is around 0.04 nm/K for a strongly confined mode in Si and very close to zero for 150 nm wide waveguide.

Figure 8B:
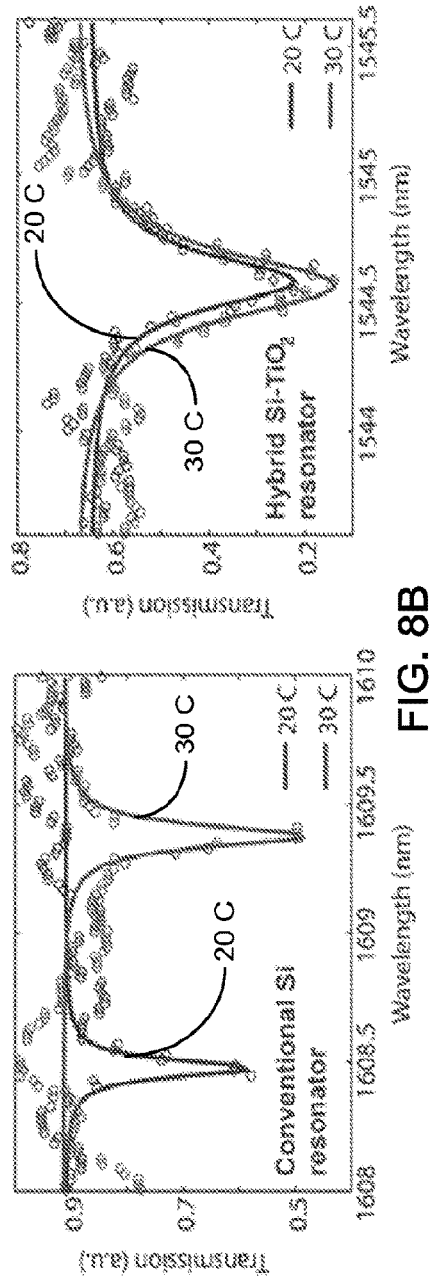
FIG. 8B shows data plots showing the temperature dependence of the resonance for an exemplary hybrid Si—$TiO_2$ resonator device compared to that of a conventional Si resonator.

FIG. 8B shows the corresponding athermal transmission spectrum compared to that of a resonator without any thermal compensation. Optical losses can be reduced significantly by improving the deposition and reducing scattering at Si—$TiO_2$ interface. Optical losses in similar material has been reported to be less than 3 dB/cm.

Exemplary implementations of the exemplary athermal Si microring resonator with $TiO_2$ cladding also demonstrated error free operation of hybrid $TiO_2$—Si microring resonator based optical filter over 35 degrees. The exemplary device used in these exemplary implementations was similar to the one shown in FIG. 7A, e.g., with an extra drop waveguide coupled to the ring. $2^{31}-1$ PRBS (pseudo random binary sequence) data was transmitted at 5 Gbps through the exemplary device, centered at resonance wavelength, and varied the stage temperature (using a thermoelectric stage and temperature controller). The exemplary data was then sent to a commercial receiver (e.g., Picometrix PT15) and a bit error rate detector.

Figure 9B:
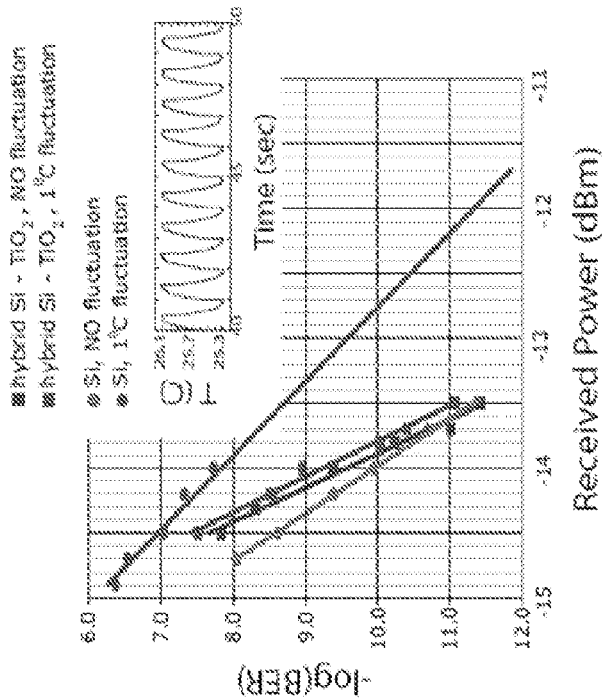
FIG. 9B shows a data plot showing BER vs. received power for no temperature fluctuation and a 1° C. temperature fluctuation using the conventional Si resonator and the exemplary hybrid Si—TiO$_2$ resonator of the disclosed technology.
Figure 9A:
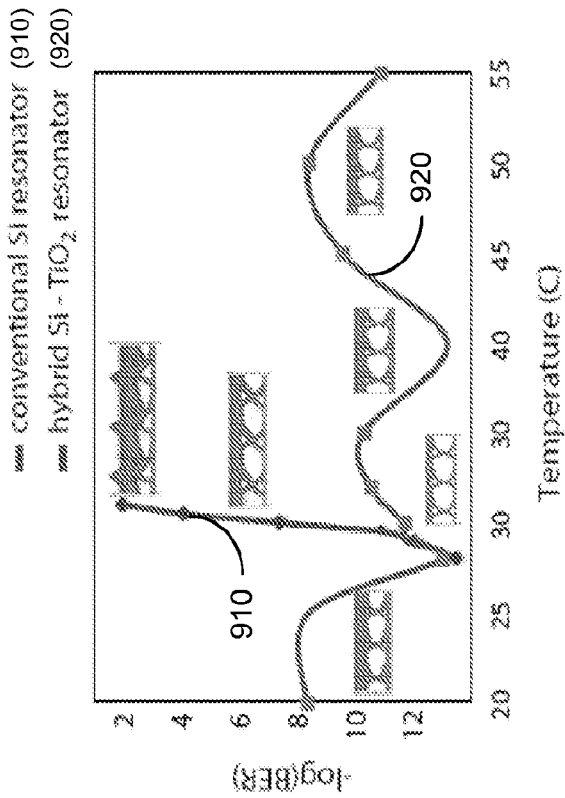
FIG. 9A shows a data plot showing the bit error rate (BER) vs. temperature for 5 Gbps data transmission using a conventional Si resonator and an exemplary hybrid Si—TiO$_2$ resonator of the disclosed technology.

FIG. 9A shows a data plot depicting the bit error rate (BER) and corresponding eye diagrams for both the athermal ring resonator and a conventional Si resonator with similar quality factor (where the temperature sensitivity is around 0.09 nm/K). For the conventional uncompensated device, BER becomes greater than $1 \times 10^{-9}$ after only 2 degrees (represented by the blue line 910 in the plot of FIG. 9A). For the exemplary athermal device, data transmission is close to error free over 35 degrees (represented by the red line 920 in the plot of FIG. 9A). This exemplary operating range can be extended even further. Slight variations in BER may have been due to fluctuation in fiber to waveguide coupling with temperature. Also characterized was the power penalty of the athermal optical filter for a 1° C. fluctuation in temperature, and compared it to an uncompensated Si resonator based filter. The 1° C. temperature fluctuation was introduced by placing the sample on a temperature controlled stage and modulating the stage temperature at a rate of 1 Hz. This amount of temperature fluctuation is small enough such that the waveguide to fiber coupling is minimally perturbed, while modeling a realistic operating condition. The conventional resonator has a power penalty >1 dB, while the exemplary hybrid Si—$TiO_2$ resonator had a power penalty <0.1 dB, as shown in the plot of FIG. 9B.

The exemplary implementations using the exemplary athermal Si photonic devices using a $TiO_2$ over cladding demonstrated that this approach provides CMOS compatible, low loss, and yields large temperature operating range. The exemplary simulations showed that athermal operation is relatively insensitive to slight variations in $TiO_2$ thickness. The disclosed techniques described engineering the mode confinement for achieving athermal operation. Such techniques can be implemented to produce optical resonators, e.g., with a radius greater than 10 µm radius (e.g., which can be due to the need for a slightly delocalized mode). The exemplary methods of passive athermalization can lead to practical monolithic integration of silicon photonic devices.

EXAMPLES

The following examples are illustrative of several embodiments of the present technology. Other exemplary embodiments of the present technology may be presented prior to the following listed examples, or after the following listed examples.

In one example of the present technology (example 1), a method for providing thermally stabilized optical device structure against temperature fluctuations includes forming an optical device structure to include a first optical material and a second optical material different from the first optical material, in which one of the first and second optical material exhibits a positive thermal-optic effect and the other one exhibits a negative thermal-optic effect; and structuring the first and second optical materials in the optical device structure to reduce a change in an effective refractive index of the optical device structure collectively produced by the first and second optical materials in response to a temperature variation.

Example 2 includes the method as in example 1, in which the structuring includes setting dimensions of the first and second optical materials to achieve a desired effective refractive index that remains nearly a constant with respect to a change in temperature.

Example 3 includes the method as in example 1, in which the first optical material is in a first region of the optical device structure and the second optical material is in a second region that is separate from and is in contact with the first region.

Example 4 includes the method as in example 3, in which the optical device structure includes an optical waveguide in which at least a portion of a waveguide cladding of the optical waveguide is made of the first optical material while a waveguide core of the optical waveguide is made of the second optical material.

Example 5 includes the method as in example 4, in which the waveguide core exhibits the positive thermal-optic effect while the portion of the waveguide cladding exhibits the negative thermal-optic effect.

Example 6 includes the method as in example 4, in which the waveguide core exhibits the negative thermal-optic effect while the portion of the waveguide cladding exhibits the positive thermal-optic effect.

Example 7 includes the method as in example 3, in which the optical device structure includes an optical waveguide which includes a waveguide cladding comprising the first optical material and a waveguide core comprising the second optical material.

Example 8 includes the method as in example 7, in which the waveguide core is surrounded by the waveguide cladding.

Example 9 includes the method as in example 7, further including a low index optical material which has an optical refractive index lower than the first or the second optical material, in which the optical core is located over the low index optical material and is covered by the waveguide cladding.

Example 10 includes the method as in example 1, in which the first and second optical materials are mixed together to co-exist in a region of the optical device structure to effectuate a desired effective refractive index that remains nearly a constant with respect to a change in temperature.

Example 11 includes the method as in example 10, in which the optical device structure is an optical waveguide that has a waveguide core in which the first and second optical materials are mixed together to co-exist and a waveguide cladding in contact with the waveguide core.

In one example of the present technology (example 12), a device for providing thermally stabilized optical property against temperature fluctuations includes a substrate, one or more silicon-based layers exhibiting a positive thermal-optic effect and formed over the substrate, and one or more metal oxide layers exhibiting a negative thermal-optical effect and formed over the substrate, in which the one or more silicon-based layers and the one or more metal oxide layers are configured to form at least one optical device based on a combination of the negative and positive thermal-optic effects to exhibit an optical behavior that remains substantially unchanged with respect to a change in temperature.

Example 13 includes the device as in example 12, in which the one or more silicon-based layers include a silicon layer, a silicon oxide layer or a silicon nitride layer, and the one or more metal oxide layers include a titanium dioxide ($TiO_2$) layer or a strontium titanate ($SrTiO_3$) layer.

Example 14 includes the device as in example 13, in which the optical device includes an optical waveguide.

Example 15 includes the device as in example 13, in which the optical device includes an optical resonator.

Example 16 includes the device as in example 13, in which the optical device includes an optical Mach-Zehnder interferometer.

Example 17 includes the device as in example 13, in which the optical device includes an optical ring.

Example 18 includes the device as in example 13, in which the optical device includes an optical modulator.

Example 19 includes the device as in example 13, in which the optical device includes an optical filter.

Example 20 includes the device as in example 12, in which the optical behavior includes an effective index of refraction of the optical device.

Example 21 includes the device as in example 12, in which the optical behavior includes an optical resonance frequency of the optical device.

Example 22 includes the device as in example 12, in which the optical behavior includes an optical frequency of an optical signal in the optical device.

In one example of the present technology (example 23), a device for providing thermally stabilized optical property against temperature fluctuations includes an optical device structure including a first optical material and a second optical material different from the first optical material, in which one of the first and second optical material exhibits a positive thermal-optic effect and the other one exhibits a negative thermal-optic effect, in which the first and second optical materials in the optical device structure are configured to collectively reduce a change in optical property of the optical device structure caused by a temperature variation.

Example 24 includes the device as in example 23, in which the first optical material includes one or more silicon-based layers that exhibit a positive thermal-optic effect, and the second optical material includes one or more metal oxide layers that exhibit a negative thermal-optic effect.

Example 25 includes the device as in example 24, in which the silicon-based layers include a silicon layer, a silicon oxide layer or a silicon nitride layer, and the metal oxide layers include a titanium dioxide ($TiO_2$) layer or a strontium titanate ($SrTiO_3$) layer.

Example 26 includes the device as in example 23, in which the optical device structure includes an optical waveguide.

Example 27 includes the device as in example 23, in which the optical device structure includes an optical resonator.

Example 28 includes the device as in example 23, in which the optical device structure includes an optical Mach-Zehnder interferometer.

Example 29 includes the device as in example 23, in which the optical device structure includes an optical ring.

Example 30 includes the device as in example 23, in which the optical device structure includes an optical modulator.

Example 31 includes the device as in example 23, in which the optical device structure includes an optical filter.

Example 32 includes the device as in example 23, in which the optical device structure includes CMOS-compatible materials.

Example 33 includes the device as in example 23, in which the optical device structure includes Si-based semiconductor materials and related dielectric materials.

Example 34 includes the device as in example 23, in which the optical device structure includes GaAs-based semiconductor materials and related dielectric materials.

Example 35 includes the device as in example 23, in which the optical device structure includes III-V semiconductor materials.

In one example of the present technology (example 36), a device for providing thermally stabilized optical property against temperature fluctuations includes an optical resonator supporting one or more optical resonator modes, and a composite structure positioned relative to the optical resonator and including a part in a near optical field from the optical resonator to be optically coupled to the optical resonator, the composite structure including materials of different thermal expansion coefficients to shift a position relative to the optical resonator in response to a change in temperature to counter a shift in optical resonance of the optical resonator due to the change in temperature.

Example 37 includes the device as in example 36, in which the optical resonator is a ring resonator, in which the composite structure includes a bi-material cantilever having a first layer of a first material and a second layer of a second material, and is suspended over the ring resonator at a close spacing to allow for optical coupling between the bi-material cantilever and the ring resonator.

Example 38 includes the device as in example 37, further comprising a cantilever support that suspends the bi-material cantilever relative to the ring resonator.

Exemplary Embodiments of Athermal Silicon Ring Resonator with Bi-Material Cantilever for Passive Thermal Feedback In addition to the above use materials or material components of both negative and positive TO coefficients, athermal integrated photonic devices may also be achieved by using materials or structures of different thermal expansion coefficients to counter the thermal fluctuations. For example, one way of using materials or structures of different thermal expansion coefficients to counter the thermal fluctuations to provide a structure to move in a way due to a thermal fluctuation as illustrated in the example for an athermal ring resonator shown in FIGS. 10A, 10B and 10C.

Ring resonators are frequently used in various optical or photonic devices including photonics chips in Si photonics technology. Waveguide ring resonators formed in Si photonic chips tend to be sensitive to ambient temperature fluctuations in part because of the high thermo-optic effect in silicon and this temperature dependence manifests in a redshift of the resonator resonance wavelength with the increase of temperature and a redshift of the resonator resonance wavelength with the decrease of temperature. This shift in wavelength for various Si based devices is about 0.1 nm/K. The design in FIGS. 10A, 10B and 10C couples the optical mode to a bi-material cantilever that is engineered to be in optical evanescent coupling with the resonator and provides a counteraction to the resonator frequency shift when the temperature changes.

Figure 10A:
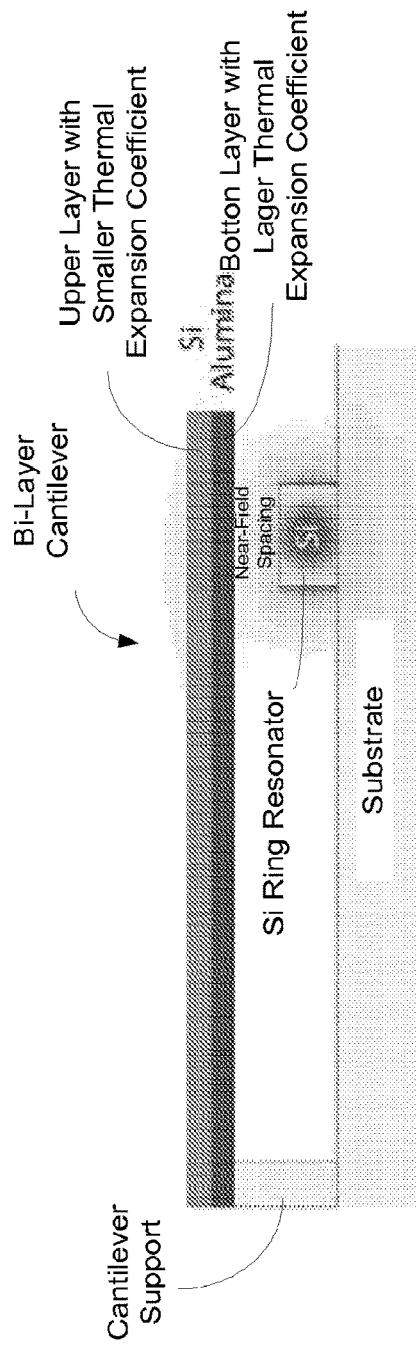
FIGS. 10A, 10B and 10C show an example of an athermal device where a composite bi-material cantilever is optically coupled to a ring resonator to counter the resonator resonance shift due to thermal fluctuations.
Figure 10C:
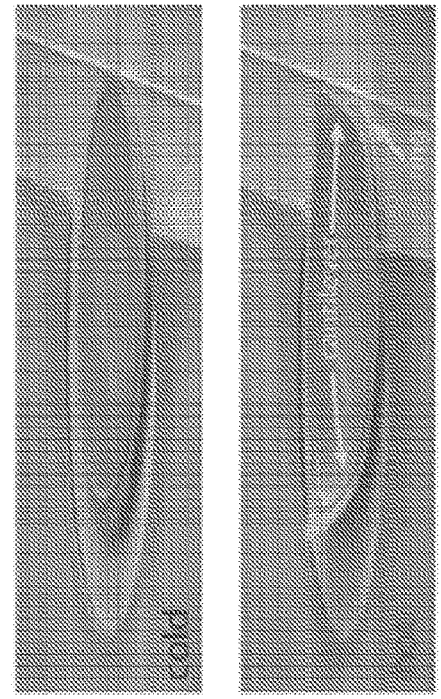
Figure 10B:
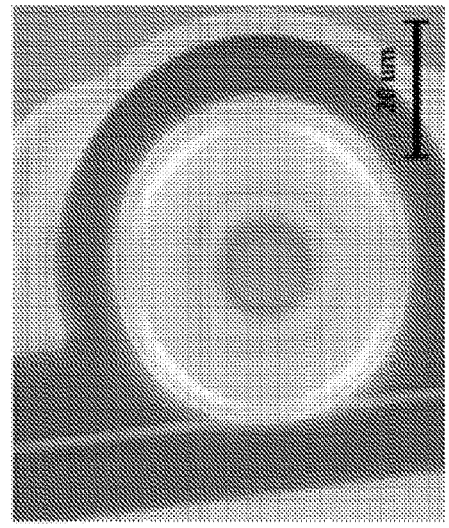

The specific design of the athermal ring resonator shown in FIGS. 10A, 10B and 10C is based on combing different technical features. First, the design is based on the recognition that a ring resonator formed by a closed ring waveguide on a substrate is subject to a change in its resonator resonance in frequency due to a change in temperature, likely a redshift in frequency when the temperature rises in most commonly used waveguide/substrate materials. Second, the design is based on another recognition that the guide light satisfying a resonance condition in an optical mode of the ring resonator is not completely spatially confined in the resonator and an adjacent structure that is sufficiently close to interface with the optical mode via optical evanescent coupling can modify the optical mode and thus, a change in such an optically coupled adjacent structure with respect to the temperature change can be designed to cause a modification to the optical mode to counter a corresponding change in the optical mode caused by the temperature change in the ring resonator. Third, the optically coupled adjacent structure can be a composite structure having different material parts with different thermal expansion coefficients to effectuate a desired change in its optical evanescent coupling with the ring resonator to counter the temperature fluctuation induced change in the resonator resonance. Accordingly, in some implementations, a photonic device having an athermal design includes an optical resonator having one or more optical resonator modes, and a structure placed relative to the optical resonator and including a composite structure having a part in a near optical field from the optical resonator to be optically coupled to the optical resonator. This composite structure includes materials of different thermal expansion coefficients to shift its position relative to the optical resonator in response to a change in temperature to counter a shift in optical resonance of the optical resonator due to the same change in temperature.

FIG. 10A shows a schematic of the device where the Si ring resonator is formed by a waveguide ring on the substrate and a bi-material cantilever is formed to include a portion that is optically coupled to an optical mode of the ring resonator. As illustrated, a cantilever support is formed on the substrate and is engaged the bi-material cantilever to suspend it over the ring resonator. The bi-material cantilever is designed to include an upper layer formed of a first material having a first thermal expansion coefficient and a lower layer formed of a second material having a second, different thermal expansion coefficient such that the cantilever bends upwards to be away from the ring resonator as temperature increases, thereby decreasing the effective index of the coupled mode and counteracting the thermo-optic effect. Similarly, when the temperature decreases, the bi-material cantilever would bend downwards towards the ring resonator to increasing the effective index of the coupled mode, thus counteracting the thermo-optic effect. This is achieved in this particular design by ensuring that the bottom layer of the cantilever has a higher thermal expansion coefficient ($\alpha$) than the top layer. An exemplary sample athermal silicon ring resonator device was constructed by using $Al_2O_3$ ($\alpha=8e^{-6}K^{-1}$) to be the bottom layer and Si ($\alpha=3e^{-6}K^{-1}$) to be the top layer, each having a thickness of 100 nm. The waveguide was made of Si of 240 nm in height and 400 nm in width. A 5-10 nm slab was left at the base of Si waveguide to isolate the buried oxide layer from the subsequent release etch step.

The exemplary measurements for the exemplary device show the capability of athermal operation over a temperature variation range of 14 degrees limited only by fabrication tolerance. When light circulates in the resonator, a small fraction of the optical field is coupled to the cantilever above, as shown in FIG. 10A. FIG. 10B shows a top view microscope image of the device. FIG. 10C shows SEM images of the device at two different temperatures where the upper image shows the device at the room temperature and the lower image shows the sample is heated to exaggerate the cantilever deflection showing the ring resonator underneath.

Figure 11B:
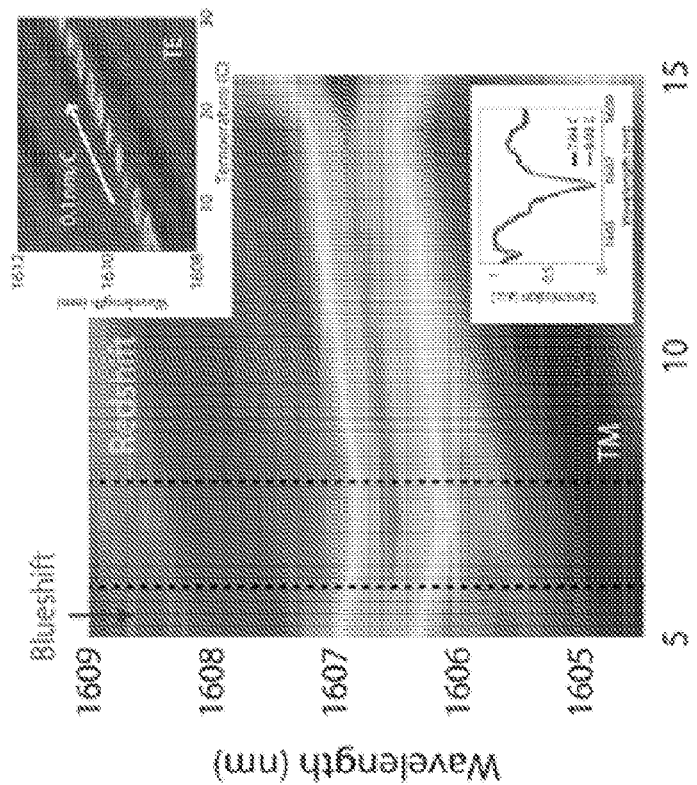
FIGS. 11A and 11B show data plots showing exemplary test results of the athermal device in FIG. 10A.
Figure 11A:
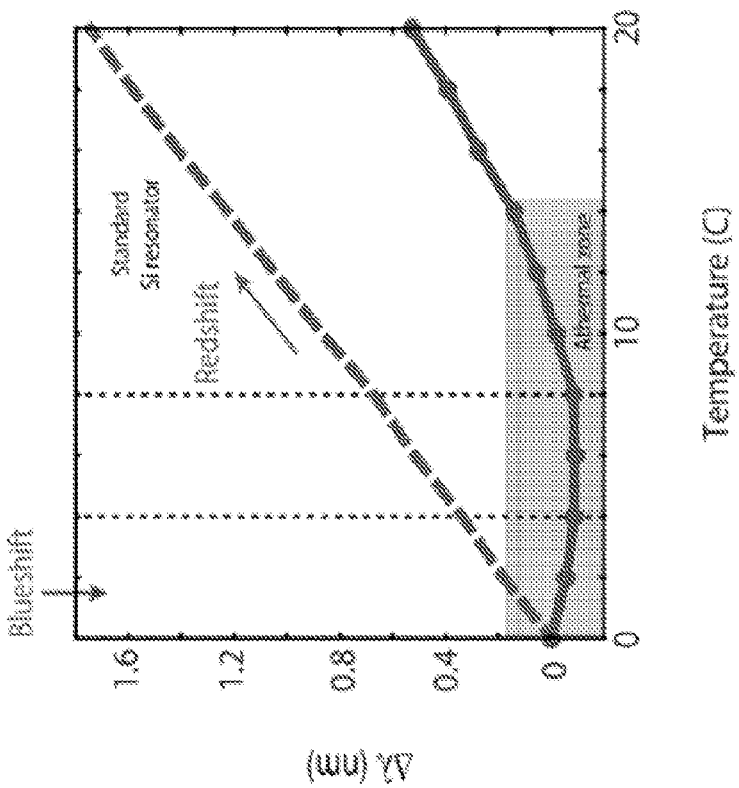

To achieve the athermal operation, the coupling gap between the cantilever and the ring resonator was designed so that slight changes in the position of the cantilever due to temperature fluctuations affected the coupled optical mode just enough to cancel the thermo-optic effect. FIGS. 11A and 11B show data plots showing exemplary test results of the exemplary athermal device in FIG. 10A. FIG. 11A shows the change in resonance wavelength of the optical mode as a function of temperature. Resonance change for a typical Si resonator (without the cantilever) is also shown by the red dashed line. There is range for which there is little change in resonance wavelength with temperature (green zone). FIG. 11B shows a measured transmission spectrum of the device as a function of temperature for TE polarization. The resonance shows blueshift at lower temperatures and conventional redshift at larger temperatures. There is an athermal zone in between. Lower inset shows the transmission spectrum for two different temperatures. Upper inset shows transmission spectrum of the TE mode of the same device which is weakly coupled to the cantilever and has a constant redshift throughout typical of standard Si ring resonators.

FIG. 11A shows the change in resonance wavelength of the TM mode (neff~2.15) as a function of temperature. It initially shows blueshift with temperature due to strong interaction with the cantilever. At higher temperatures it shows conventional redshift due to thermo-optic effect. When the gap is optimally chosen, the resonance wavelength changes minimally over a certain temperature range yielding an athermal operating zone.

Exemplary implementations were performed with the above exemplary device, which demonstrated that resonance sensitivity changes from conventional redshift to zero to strong blueshift with temperature as the cantilever interaction with the optical mode increases, when it is brought closer to the waveguide. FIG. 11B shows the device transmission spectrum of the TM mode as a function of temperature over a range of 15 degrees. The TM polarization was used for this experiment because the mode is more delocalized and hence interacts strongly with the cantilever. At temperatures of 10 C and above, the gap between the cantilever and the waveguide is large enough such that thermo-optic effect dominates and resonance redshifts with increase in temperature. As the temperature is reduced, the cantilever moves closer to the waveguide such that any change in effective index of the mode due to thermo-optic effect is compensated by coupling to the mechanical deflection of the cantilever. Further reduction in temperature brings the cantilever even closer to the waveguide and leads to overall increase in cavity size, hence the blueshift of resonance wavelength with temperature.

For comparison, FIG. 11B further shows the spectrum of TE mode of the same device as a function of temperature. Since this mode is more confined in Si, it has little interaction with the cantilever and shows a constant redshift of 0.1 nm/C, typical of silicon ring resonators.

The above method of thermal compensation is independent of the cavity size, cavity type, Q factor and can be optimized to yield a much larger athermal operating range. This can be done by optimizing the gap and linearizing the cantilever sensitivity to temperature. No extra footprint is required in the device layer to implement this scheme. With proper design, this scheme can significantly reduce the thermal budget in silicon photonic integration.

Sensitivity of any photonic structure to ambient temperature fluctuations stems from the fact that increase in temperature increases the refractive index of all commonly used materials like Si, $SiO_2$, $Si_3N_4$ etc. This is called thermo-optic effect, which is a fundamental material property. Enhanced thermo-optic coefficient in some materials like Si makes it easier to thermally tune Si based photonic devices. But the same property makes these photonic devices extremely susceptible to temperature fluctuations. This problem manifests in redshift of cavity wavelength with increase of temperature—the resonance wavelength increases as the temperature increases. For Si based devices this redshift is ~0.1 nm/C. To combat this problem, a variety of approaches are disclosed herein.

To passively counteract the redshift of resonance wavelength with increase in temperature, the cavity needs to be coupled to a mechanism which is capable of countering the temperature-induced shift in resonance wavelength, e.g., blueshifting the resonance wavelength as temperature increases in the example described above. This may be achieved by, e.g., using a polymer with a negative thermo-optic coefficient or a MZI whose spectrum blueshifts with temperature.

The following provides a new waveguide geometry where the positive (redshift) of the optical mode index is counteracted by coupling the mode to a bi-material cantilever whose mechanical movement causes a negative (blueshift) change in the optical mode index as temperature increases.

Figure 12A:
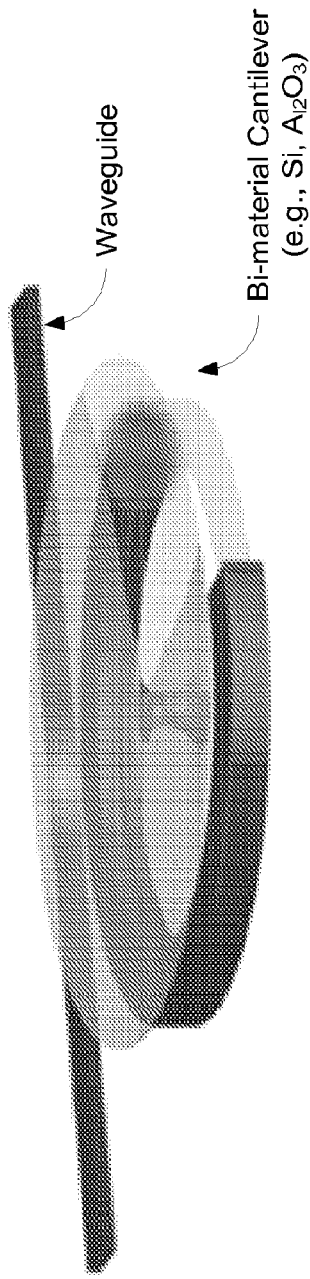
FIGS. 12A and 12B show illustrative schematics of an exemplary athermal bi-material cantilever device.
Figure 12B:
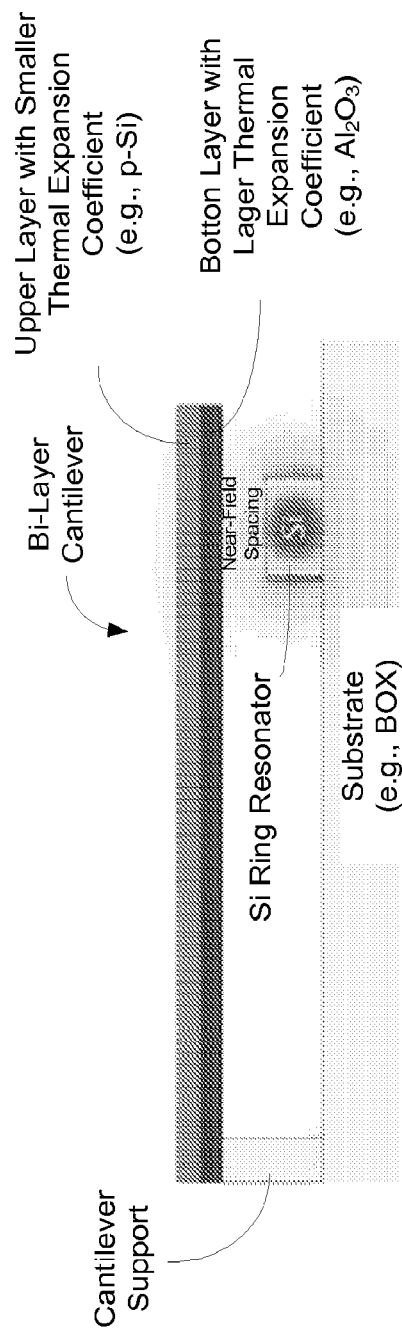

FIGS. 12A and 12B show an example of an exemplary device with illustrative schematics showing a three-dimensional view and cross-sectional view. FIG. 12A shows a three-dimensional illustrative schematic of an exemplary 'smart ring' device including a bi-material cantilever coupled to the waveguide. FIG. 12B shows a cross-section view of the exemplary device.

The exemplary photonic device shown in FIGS. 12A and 12B includes a substrate; an optical resonator formed on the substrate; and a cantilever engaged to the substrate and structured to include a cantilever suspended section that is suspended over the optical resonator at a position to enable optical coupling between the optical resonator and the cantilever suspended section. The optical resonator can be in various resonator configurations such as a ring resonator as shown. The cantilever is structured to include two or more different materials to form a composite structure that bends the cantilever suspended section to be away from the optical resonator when a temperature at the device rises and to be closer to the optical resonator when the temperature at the device decreases to counter a thermal change in the optical resonator.

The exemplary device shown in FIGS. 12A and 12B is based on a buried oxide (BOX) structure that is compatible to CMOS processing. An optical ring resonator is formed (e.g., by Si waveguide as shown). This ring resonator expands as the temperature rises so that its resonance wavelength increases or redshifts. A cantilever formed of two or more materials is engaged to a support structure which is show as a vertical support on the left side of FIG. 12B so that the cantilever is fixed to the support structure at one end and is suspended over the ring resonator on the other end. The suspended part of the cantilever is spaced from the optical ring resonator in a close proximity to enable optical coupling between the cantilever and the optical ring resonator. This optical coupling can be based on the near-field coupling via optical evanescent fields of optical modes in the ring resonator and the optical modes in the cantilever.

The cantilever is designed to include a composite structure with two or more different materials with different thermal properties. In the illustrated example shown in FIGS. 12A and 12B, the cantilever is formed of two different materials as two elongated slabs that are engaged to each other. Such a cantilever is structured such that it bends upwards to be away from the optical ring resonator (e.g., decreasing the optical coupling between the cantilever and the optical ring resonator) as the temperature increases and, conversely, bends downwards to be closer to the optical ring resonator (e.g., increasing the optical coupling between the cantilever and the optical ring resonator) as the temperature decreases.

In the exemplary biomaterial design, this is achieved by choosing the bottom layer of the cantilever closer to the optical ring resonator to have a higher thermal expansion coefficient than the top layer. In a specific prototype that was constructed, two materials for the biomaterial cantilever were Alumina (e.g., $\alpha=8\times10^{-6}$ $K^{-1}$) and Silicon (e.g., $\alpha=3\times 10^{-6}$ $K^{-1}$), each 100 nm thick, although many other materials are similarly compatible like SiN, Al etc. The waveguide was made of Si which is 250 nm high and 400 nm wide. For example, a 5-10 nm slab was left at the base of Si waveguide to isolate the buried oxide layer from subsequent release etching step. As clear from the optical mode of this structure shown in FIG. 12B, small fraction of the optical field is coupled to the cantilever on top. The strength of this coupling can be engineered by cantilever layers and thicknesses as well the initial gap. In the weak coupling regime, the optical mode would be minimally perturbed by change in cantilever position while in strong coupling regime; small change in cantilever position would affect the optical mode drastically. For athermal operation, the coupling is engineered so that it's just enough to cancel out the thermo-optic change of the optical mode.

Figure 13:
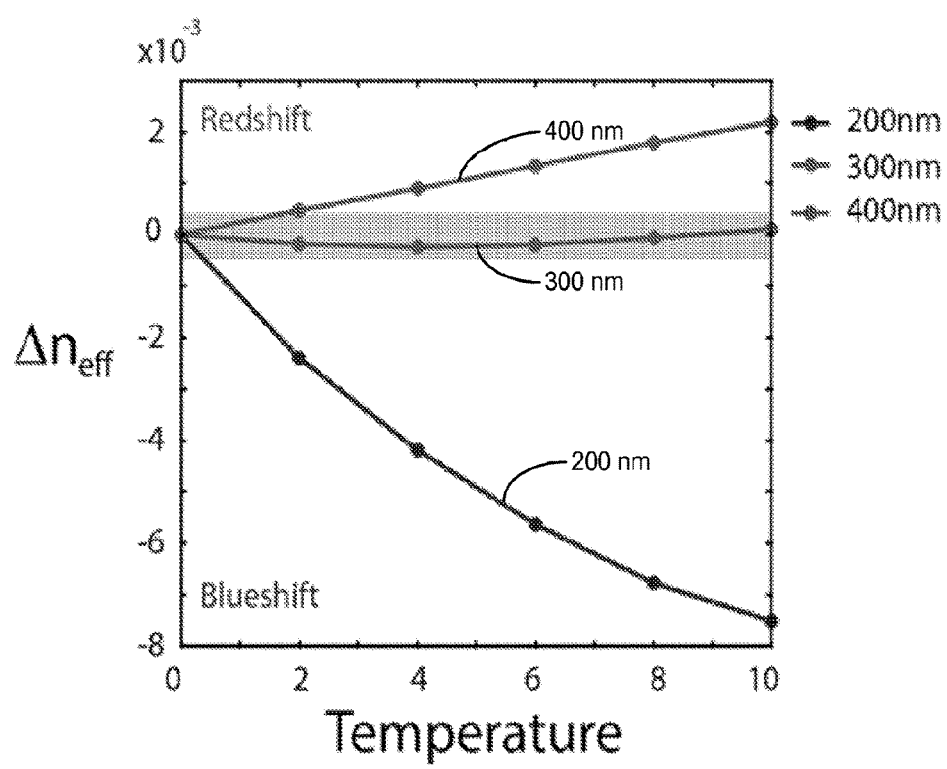
FIG. 13 shows a data plot showing the change in effective mode index of the TE mode as a function of temperature for different coupling gaps of an exemplary cantilever device.

FIG. 13 shows a data plot showing the change in effective mode index of the TE mode ($n_{eff}$~2.27) as a function of temperature for several different initial gaps (e.g., different coupling gaps of the exemplary cantilever). For example, when the cantilever is far away, change in effective index is positive and constant. As the coupling gap is reduced, the cantilever interacts strongly with the optical mode and causes giant negative change. Somewhere in between, there is an optimum coupling gap which results in no change in mode $n_{eff}$ with temperature. This is indicated by the exemplary green shaded box shown in the data plot of FIG. 13. For example, when gap is too large $n_{eff}$ increases with temperature at a rate of ~$2 \times 10^{-4}$ $K^{-1}$. At very small gaps (e.g., 200-300 nm), $n_{eff}$ strongly decreases with temperature. At some intermediate gaps (e.g., 300-350 nm), change in $n_{eff}$ is very minimal with change in temperature.

Figure 14:
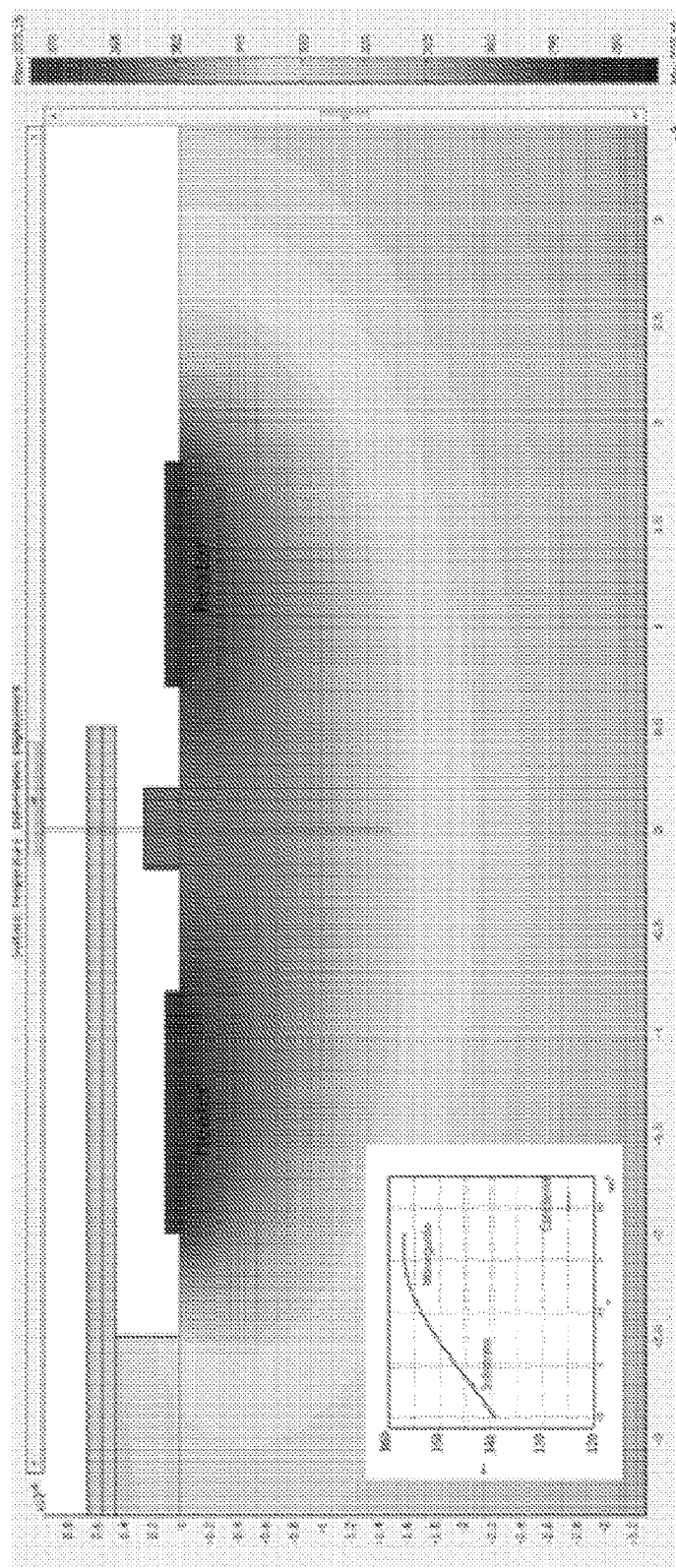
FIG. 14 shows data plots showing local heating effects on an exemplary Si waveguide.

Exemplary simulations were performed providing exemplary results depicting tuning and athermal behavior. For example, a slight modification to the same scheme allows one to tune the resonator's central wavelength, to compensate for fabrication imperfections, while simultaneously maintaining athermal operation. This is achieved by introducing a local heater in the vicinity of the Si waveguide, which is illustrated in FIG. 14. FIG. 14 shows a plot including an inset plot showing data indicating that exemplary heaters placed in close proximity to the waveguide can be used to locally heat the Si waveguide, without affecting the cantilever significantly. The exemplary inset plot shows the relative temperature change in the waveguide and cantilever. The heater generates a temperature gradient which is strongly localized around the Si waveguide. Temperature change in the cantilever is very small because the undercut provides a large thermal resistance to heat flow. Hence the resonance wavelength can be tuned by adjusting the Si waveguide temperature while simultaneously maintaining athermal operation.

For example, the resonance wavelength can also be tuned through free-carrier injection, by surrounding the waveguide with a p-i-n diode, which also does not affect the cantilever.

For example, the cantilever gap can be tuned using capacitive/electrostatic tuning, without affecting the mode in Si waveguide.

Since there are multiple ways in which the mode in Si waveguide can be tuned without affecting the cantilever gap, and vice-versa, it is possible to simultaneously achieve tuning of the resonance to compensate for any fabrication variations while maintaining athermal operation. This exemplary tuning operation can be difficult to achieve in various other passive thermal compensating schemes.

Described below are examples for ultra-low power tuning of photonic structures. Static tuning of these photonic structures is possible in addition to the athermal behavior. This can be achieved either through capacitive tuning or thermal tuning, both of which would be lower power than state-of-the-art thermal tuning mechanisms.

Capacitive Tuning

This is achieved using capacitive actuation, which is an ultra-low power tuning mechanism. A possible configuration of this tuning scheme is shown in FIG. 14. Electrostatic force between two electrodes, one placed on the cantilever and the other one on the nearby substrate causes small deflection of the cantilever which is sufficient to tune the cavity resonance by several linewidths. For example, this method of tuning is inherently low power, e.g., of the order of mW/FSR, because of small capacitance between the two electrodes and absence of any active current path. This is in comparison, for example, to the best demonstrated thermal tuning schemes 20-30 mW/FSR and carrier injection based tuning 10 mW/FSR.

Low Power Thermal Tuning

Modification of the same scheme allows one to engineer the thermo-optic response of photonic structures based on this novel waveguide geometry and break the conventional tuning efficiency limit of Si based devices. For example, conventional tuning efficiency (mW/nm) of Si based devices has two limitations—one stems from the thermo-optic coefficient of Si which limits the temperature tuning efficiency to ~0.1 nm/K. Another bottleneck is thermal conductance from the heating element to the waveguide (K/W) which determines the efficiency of translating total power dissipated for heating to actual temperature change seen by the optical mode. The disclosed technology provides an approach to break the first limitation and achieve unprecedented temperature sensitivity of the optical mode.

An exemplary technique is illustrated in FIGS. 15A and 15B, where the cantilever is now strongly coupled to the Si waveguide. FIGS. 15A and 15B shows diagrams and plots depicting an exemplary low power thermal tuning technique.

As shown in FIGS. 15A and 15B, two different exemplary cantilever designs are considered—one where the cantilever is still made of a material with higher thermal expansion coefficient at bottom and another one where material with higher thermal expansion coefficient is at the top. In both these cases a heater is placed in close proximity to both the waveguide and the cantilever to control their temperatures locally. In the former case, one can achieve giant blueshift of the resonance wavelength with temperature because the cantilever moves away from the waveguide as temperatures increases. In the latter case one can achieve giant redshift of the resonance wavelength with temperature because the cantilever moves towards the waveguide as temperature increases. The mode sensitivity ($\delta n_{eff}/\delta T$) in either case is ~$7 \times 10^{-4}$ $K^{-1}$, which is already over 3 times higher than conventional thermo-optic effect in Si ($2 \times 10^{-4}$ $K^{-1}$). The tuning efficiency of these cantilever coupled waveguide systems can be further engineered through the coupling gap, material layer choice and layer thicknesses. It is also noted that tuning efficiency can be significantly enhanced by using a metal layer for higher thermal expansion coefficient. This is because metals have much higher thermal expansion coefficients (e.g. $\alpha Al = 23 \times 10^{-6}$ $K^{-1}$) than Alumina ($\alpha Alumina = 8 \times 10^{-6}$ $K^{-1}$), so they are much more sensitive to small temperature changes.

FIG. 15A shows a diagram and plot showing a change in cantilever deflection that reduces the optical mode index. FIG. 15B shows a diagram and plot showing a change in cantilever deflection that increases the optical mode index. In both figures, the exemplary green curve represents the case when the cantilever is far away, so the resulting change is the conventional thermo-optic limit, and the exemplary blue curves represent the case when cantilever is strongly coupled to the waveguide.

Therefore, a novel thermal management scheme is provided for Si based photonic structures by coupling the optical mode to a suspended bi-material cantilever. This technique can be used to achieve athermal operation of any photonic structure (e.g., MZI, ring resonator, photonic crystal cavity) independent of cavity quality factor, cavity size or mode volume. This technique can also be used to actively tune the resonance wavelength on demand, while achieving athermal operation around any operating wavelength. This unique thermal management scheme can be implemented to significantly reduce the thermal budget of silicon photonic systems and make them more viable for commercial integration.

Some examples of devices and methods of the Si-based photonic structures by coupling the optical mode to a suspended bi-material cantilever are described.

In one example, a photonic device includes a substrate; an optical resonator formed on the substrate; and a cantilever engaged to the substrate and structured to include a cantilever suspended section that is suspended over the optical resonator at a position to enable optical coupling between the optical resonator and the cantilever suspended section, the cantilever being structured to include two or more different materials to form a composite structure that bends the cantilever suspended section to be away from the optical resonator when a temperature at the device rises and to be closer to the optical resonator when the temperature at the device decreases to counter a thermal change in the optical resonator. In some implementations of the device, the cantilever suspended section can include two different materials. In some implementations of the device, for example, the optical resonator can be a ring optical resonator. In some implementations of the device, for example, the cantilever suspended section can include an electrically conductive component; and the device can include a control electrode that is spaced from the electrically conductive component of the cantilever suspended section and a control circuit that applies a control electrical signal to electrically control the spacing between the cantilever suspended section and the optical resonator to tune a resonance wavelength of the optical resonator.

In another example, a method to thermally stabilize a photonic device includes providing an optical resonator on a substrate; engaging a cantilever to the substrate to include a cantilever suspended section that is suspended over the optical resonator at a position to enable optical coupling between the optical resonator and the cantilever suspended section; and structuring the cantilever to include two or more different materials to form a composite structure that bends the cantilever suspended section to be away from the optical resonator when a temperature at the device rises and to be closer to the optical resonator when the temperature at the device decreases to counter a thermal change in the optical resonator.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this patent document.

What is claimed is:

1. A device for providing thermally stabilized optical property against temperature fluctuations, comprising:
   an optical resonator supporting one or more optical resonator modes; and
   a composite structure suspended directly above the optical resonator at a close spacing to allow for optical coupling between the composite structure and the optical resonator and including a part in a near optical field from the optical resonator to be optically coupled to the optical resonator, the composite structure including materials of different thermal expansion coefficients to shift a position relative to the optical resonator in response to a change in temperature to counter a shift in optical resonance of the optical resonator due to the change in temperature.

2. The device as in claim 1, wherein:
   the optical resonator is a ring resonator,
   the composite structure includes a bi-material cantilever having a first layer of a first material and a second layer of a second material.

3. The device as in claim 2, further comprising a cantilever support that suspends the bi-material cantilever relative to the ring resonator.

4. The device as in claim 3, wherein:
   the first layer of the first material is positioned to face the optical ring resonator while the second layer of the second material faces away from the optical ring resonator; and
   the first material has a first thermal expansion coefficient greater than a thermal expansion coefficient of the second material.

5. The device as in claim 1, wherein the composite structure includes a bi-material cantilever having a first layer of a first material and a second layer of a second material, and is suspended over the ring resonator at a close spacing to allow for optical coupling between the bi-material cantilever and the ring resonator,
   wherein the device further includes:
   an optical waveguide placed near the optical resonator to be optically coupled to the optical resonator for coupling light in or out of the optical resonator;
   a cantilever support that suspends the bi-material cantilever relative to the optical resonator.

6. The device as in claim 5, wherein the first material includes Alumina and the second material includes Silicon.

7. The device as in claim 5, further comprising:
a resonance tuning device coupled to the optical resonator to tune a resonance frequency of the optical resonator, rendering the optical resonator tunable while being stabilized against a temperature change.

8. The device as in claim 7, wherein:
the resonance tuning device includes a heater placed near the optical resonator to creates a localized heating at the optical resonator to tune the resonance frequency of the optical resonator.

9. The device as in claim 8, wherein:
the first layer of the first material is positioned to face the optical resonator while the second layer of the second material faces away from the optical ring resonator; and
the first material has a first thermal expansion coefficient greater than a thermal expansion coefficient of the second material.

10. The device as in claim 8, wherein:
the first layer of the first material is positioned to face the optical resonator while the second layer of the second material faces away from the optical ring resonator; and
the first material has a first thermal expansion coefficient smaller than a thermal expansion coefficient of the second material.

11. The device as in claim 7, further comprising:
a substrate on which the optical resonator and the optical waveguide are formed, and
wherein the resonance tuning device includes a first capacitor electrode formed on the substrate under the bi-material cantilever; and a second capacitor electrode formed on the bi-material cantilever facing the first capacitor electrode to form a capacitive tuning device for tuning the resonance frequency of the optical resonator.

12. The device as in claim 1, wherein the optical resonator includes:
one or more silicon-based layers exhibiting a positive thermal-optic effect; and
one or more metal oxide layers exhibiting a negative thermal-optical effect,
wherein the one or more silicon-based layers and the one or more metal oxide layers are configured to form at least one optical device based on a combination of the negative and positive thermal-optic effects to exhibit an optical behavior that remains substantially unchanged with respect to a change in temperature.

13. The device as in claim 1, wherein the optical resonator includes an optical device structure including a first optical material and a second optical material different from the first optical material, wherein one of the first and second optical material exhibits a positive thermal-optic effect and the other one exhibits a negative thermal-optic effect, and wherein the first and second optical materials in the optical device structure are configured to collectively reduce a change in optical property of the optical device structure caused by a temperature variation.

* * * * *